United States Patent
Couret et al.

(10) Patent No.: US 12,061,850 B2
(45) Date of Patent: Aug. 13, 2024

(54) DESIGNING A 3D MODELED OBJECT VIA ORIENTATION OPTIMIZATION

(71) Applicant: DASSAULT SYSTEMES, Velizy Villacoublay (FR)

(72) Inventors: Laura Marion Couret, Velizy Villacoublay (FR); Martin-Pierre Schmidt, Velizy Villacoublay (FR); Claus Bech Wittendorf Pedersen, Hamburg (DE)

(73) Assignee: DASSAULT SYSTEMES, Velizy Villacoublay (FR)

(*) Notice: Subject to any disclaimer, the term of this patent is extended or adjusted under 35 U.S.C. 154(b) by 110 days.

(21) Appl. No.: 17/124,386

(22) Filed: Dec. 16, 2020

(65) Prior Publication Data
US 2021/0182456 A1  Jun. 17, 2021

(30) Foreign Application Priority Data

Dec. 16, 2019 (EP) ..................... 19306655

(51) Int. Cl.
*G06F 30/23* (2020.01)
*G06F 30/10* (2020.01)
*G06T 17/20* (2006.01)

(52) U.S. Cl.
CPC .............. *G06F 30/23* (2020.01); *G06F 30/10* (2020.01); *G06T 17/205* (2013.01)

(58) Field of Classification Search
CPC ........ G06F 30/23; G06F 30/25; G06F 30/367; G06F 30/398; G06F 2111/00;
(Continued)

(56) References Cited

U.S. PATENT DOCUMENTS 5,841,892 A * 11/1998 McGrath ............... G06T 7/73
382/173
8,165,856 B1 * 4/2012 Goel ....................... G06F 30/23
703/2
(Continued)

OTHER PUBLICATIONS

Kiyono et al. (Non-Patented Literature, "A novel fiber optimization method based on normal distribution function with continuously varying fiber path") (Year: 2016).*
(Continued)

*Primary Examiner* — Akash Saxena
(74) *Attorney, Agent, or Firm* — Oblon, McClelland, Maier & Neustadt, L.L.P.

(57) ABSTRACT

A computer-implemented method for designing a 3D modeled object. The 3D modeled object represents a mechanical part formed in a material having an anisotropic behavior with respect to a physical property. The method includes obtaining a 3D finite element mesh and data associated to the 3D finite element mesh. The data associated to the 3D finite element mesh includes a plurality of forces and boundary conditions. The plurality of forces forms multiple load cases. The method further comprises optimizing an orientation field distributed on the 3D finite element mesh with respect to an objective function. The objective function rewards orientation continuity with respect to the physical property. The optimizing is based on the 3D finite element mesh and on the data associated to the 3D finite element mesh. This constitutes an improved method for designing a 3D modeled object.

12 Claims, 10 Drawing Sheets

(58) Field of Classification Search
CPC ...... G06F 2119/22; G06F 30/10; G06F 30/00;
G06F 30/17; G06F 30/18; G06F 2111/06;
G06F 2113/24; G06F 2113/26; G06F
2111/04; G06T 17/205; G06T 17/00
See application file for complete search history.

(56) References Cited

U.S. PATENT DOCUMENTS

| | | | | |
|---|---|---|---|---|
| 8,970,590 | B1* | 3/2015 | Brennan | G06T 17/20 |
| | | | | 345/581 |
| 9,576,088 | B2 | 2/2017 | Nomura et al. | |
| 9,606,830 | B2* | 3/2017 | Liang | G06F 9/4818 |
| 9,656,429 | B1* | 5/2017 | Mantha | B33Y 50/02 |
| 2014/0288893 | A1* | 9/2014 | Blom | G06F 30/23 |
| | | | | 703/1 |
| 2016/0009368 | A1* | 1/2016 | Kismarton | B64C 3/26 |
| | | | | 428/113 |
| 2017/0372480 | A1* | 12/2017 | Anand | G06F 30/20 |
| 2018/0372488 | A1* | 12/2018 | Winfree | B29C 70/382 |
| 2019/0236220 | A1* | 8/2019 | Nomura | G06F 30/20 |
| 2020/0055252 | A1* | 2/2020 | Lewicki | G06F 30/20 |
| 2020/0143009 | A1* | 5/2020 | Schmidt | G06F 30/23 |
| 2020/0191766 | A1* | 6/2020 | Kim | G01N 29/4418 |
| 2020/0356638 | A1* | 11/2020 | Nomura | G06F 30/15 |
| 2021/0145608 | A1* | 5/2021 | Herr | A61B 8/0825 |
| 2021/0173979 | A1* | 6/2021 | Gerzen | G06T 17/20 |
| 2021/0182456 | A1* | 6/2021 | Couret | G06T 17/205 |
| 2021/0187789 | A1* | 6/2021 | Nomura | B29B 11/16 |
| 2022/0250342 | A1* | 8/2022 | Metzner | B29C 70/68 |
| 2022/0405442 | A1* | 12/2022 | Schmidt | G06F 30/10 |
| 2023/0133725 | A1* | 5/2023 | Schmidt | G06T 17/205 |
| | | | | 703/2 |
| 2023/0182397 | A1* | 6/2023 | Kubalak | B29C 64/236 |
| | | | | 700/118 |
| 2023/0325561 | A1* | 10/2023 | Chandrasekhar | B33Y 50/00 |
| | | | | 703/1 |

OTHER PUBLICATIONS

Liu et al. (Non-Patented Literature, "A novel CACD/CAD/CAE integrated design framework for fiber-reinforced plastic parts") (Year: 2014).*

Deaton et al. (Non-Patented Literature, "A survey of structural and multidisciplinary continuum topology optimization: post 2000") (Year: 2012).*

Petrovic et al. (Non-Patented Literature, "Orthotropic material orientation optimization method in composite laminates") (Year: 2016).*

Inci et al. (Non-Patented Literature, "Discrete Fiber Angle and Continuous Fiber Path Optimization in Composite Structures") (Year: 2012).*

Lund (Non-Patented Literature, "Finite Element Based Design Sensitivity Analysis and Optimization") (Year: 1994).*

Delin Jiang et al., "Continuous Fiber Angle Topology Optimization for Polymer Composite Deposition Additive Manufacturing Applications," 2019, Fibers 2019, 7, 14, pp. 1-21 (Year: 2019).*

Alexander A. Safonov, "3D topology optimization of continuous fiber-reinforced structures via natural evolution method," 2019, Composite Structure, 215, pp. 289-297 (Year: 2019).*

Christopher J. Brampton et al., "New optimization method for steered fiber composites using the level set method," 2015, Struct Multidisc Optim (2015) 52, pp. 493-505 (Year: 2015).*

Deaton, J.D., Grandhi, R.V. A survey of structural and multidisciplinary continuum topology optimization: post 2000. Struct Multidisc Optim 49, 1-38 (2014) https://doi.org/10.1007/s00158-013-0956-z (Year: 2014).*

Schmidt, MP., Pedersen, C.B.W. & Gout, C. On structural topology optimization using graded porosity control. Struct Multidisc Optim 60, 1437-1453 (2019). https://doi.org/10.1007/s00158-019-02275-x (Year: 2019).*

Mingdong Zhou, et al., "Minimum Length Scale in Topology Optimization by Geometric Constraints"., Preprint submitted to Computer Methods in Applied Mechanics and Engineering Sep. 3, 2015.

Boyan S. Lazarov et al., "Length Scale and Manufacturability in Density Based Topology Optimization", 2016, Published in: Archive of Applied Mechanics, 86(1-2), 189-218. https://doi.org/10.1007/s00419-015-1106-4.

Delin Jiang, et al. "Continuous Fiber Angle Topology Optimization for Polymer Composite Deposition Additive Manufacturing Applications", Fibers 2019, 7, 14; doi:10.3390/fib7020014.

Jaewook Lee, et al., "Topology Optimization for Continuous and Discrete Orientation Design of Functionally Graded Fiber-reinforced Composite Structures", Composite Structures 201 (2018) 217-233.

Michael, Molitch-Hou, "Arevo Looks to Take on Carbon Fiber 3D Printing with New Funding and CEO", http://www.engineering.com/Author/ID/363720/Michael Molitch-Hou) posted on May 17, 2018.

Tsuyoshi Nomura, et al. "Simultaneous Optimization of Topology and Orientation of Anisotropic Material using Isoparametric Projection Method", 11th World Congress on Structural and Multidisciplinary Optimization, Jun. 7-12, 2015, Sydney Australia.

Bridget O'Neal, Istanbul Thesis Student Explores Continuous Fiber Composites in FDM 3D Printing Apr. 25, 2019.

N. Ranaivomiarana, F.-X. Irisarri, D. Bettebghor and B. Desmorat, "Optimal Orthotropy and Density Distribution of Two Dimensional Structures". Article in Mathematics and Mechanics of Complex Systems • Oct. 2018, vol. 6, No. 4, DOI: 10.2140/memocs.2018.6.293.

Alexander A. Safonov, "3D topology Optimization of Continuous Fiber-reinforced Structures Via Natural Evolution Method", Accepted Feb. 15, 2019, Composite Structures 215 (2019) 289-297.

O. Sigmund, et al., "Numerical Instabilities in Topology Optimization A Survey on Procedures Dealing with Checkerboards, Mesh-dependencies and Local Minima", Structural Optimization 16, 68-75, 1998.

Krister Svanberg, "The Method of Moving Asymptotes—A New Method for Structural Optimization, International Journal for Numerical Methods in Engineering", vol. 24, 359-373 (1987).

M. P. Bendsoe, O. Sigmund, "Topology Optimization Theory, Methods and Applications", ISBN 3-540-42992-1Springer-Verlag Berlin Heidelberg New York, 2004.

Felipe Fernandez, et al., "Optimal Design of Fiber Reinforced Composite Structures and Their Direct Ink Write Fabrication", Comput. Methods Appl. Mech. Engrg. 353 (2019) 277-307.

R. Hoglund, et al., "Continuous Fiber Angle Topology Optimization for Polymer Fused Filament Fabrication", 2016, pp. 1078-1090.

Jiuchun Gao, "Optimal Motion Planning in Redundant Robotic Systems for Automated Composite Lay-up Process", Comput. Methods Appl. Mech. Engrg. 353 (2019) 277-307.

C.Y. Kiyono, et al. "A Novel Fiber Optimization Method Based on Normal Distribution Function with Continuously Varying Ffiber Path", Composite Structures 160 (2017) 503-515. XP29834127.

Mario Petrovic, et al. "Orthotropic Material Orientation Optimization Method in Composite Laminates", Struct Multidisc Optim (2018) 57:815-828. XP36394914.

Yuqing Zhou, et al., "Multi-component Topology and Material Orientation Design of Composite Structures (MTO-C)", Comput. Methods Appl. Mech. Engrg. 342 (2018) 438-457. XP55573949.

European Search Report dated Jun. 18, 2020, in corresponding application No. EP/19306655.2.

* cited by examiner

DESIGNING A 3D MODELED OBJECT VIA ORIENTATION OPTIMIZATION

CROSS-REFERENCE TO RELATED APPLICATIONS

This application claims priority under 35 U.S.C. § 119 or 365 to European Application No. 19306655.2, filed Dec. 16, 2019. The entire contents of the above application(s) are incorporated herein by reference.

FIELD

The disclosure relates to the field of computer programs and systems, and more specifically to a method, system and program for designing a 3D modeled object representing a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context of industrial design, designing a 3D modeled object representing a mechanical part formed in a material having an anisotropic behavior with respect to a physical property is gaining wide importance.

The following papers relate to this field and are referred to hereunder:
[1] R. Hoglund and D. E. Smith, "Continuous Fiber Angle Topology Optimization for polymer Fused Filament," 2016,
[2] A. A. Safonov, "3D topology optimization of continuous fiber-reinforced structures via natural evolution method," 2019,
[3] J. Lee, D. Kim, T. Nomura, E. M. Dede and J. Yoo, "Topology optimization for continuous and discrete orientation design of functionally graded fiber-reinforced composite structures," 2018,
[4] N. Ranaivomiarana, F.-X. Irisarri, D. Bettebghor and B. Desmorat, "Optimal orthotropy and density distribution of two-dimensional structures," Mathematics and Mechanics of Complex Systems, 2018,
[5] T. Nomura, E. M. Dede, T. Matsumori and A. Kawamoto, "Simultaneous Optimization of Topology and Orientation of Anisotropic Material using Isoparametric Projection Method," 2015,
[6] B. S. Lazarov, F. Wang and O. Sigmund, "Length scale and manufacturability in density-based topology optimization," 2016,
[7] O. Sigmund and J. Petersson, "Numerical instabilities in topology optimization: A survey on procedures dealing with checkerboards, mesh-dependencies and local minima," 1998,
[8] M. Zhou, B. S. Lazarov, F. Wang and O. Sigmund, "Minimum length scale in topology optimization by geometric constraints," 2015,
[9] T. Nomura and E. M. Dede, "METHODS FOR ORIENTING MATERIAL PHYSICAL PROPERTIES USING CONSTRAINT TRANSFORMATION AND ISOPARAMETRIC SHAPE FUNCTIONS". 2014. Pending patent,
[10] Felipe Fernandeza, W. Scott Connpelb, James P. Lewickib and Daniel A. Tortorellia, "Optimal design of fiber reinforced composite structures and their direct ink write fabrication". Comput. Methods Appl. Mech. Engrg. 353 (2019) 277-307,
[11] Jiuchun Gao, "Optimal Motion Planning in Redundant Robotic Systems for Automated Composite Lay-up Process". Comput. Methods Appl. Mech. Engrg. 353 (2019) 277-307., and
[12] M. P. Bendsøe and O. Sigmund, Topology Optimization—Theory, Methods, and Applications, 2004.

These methods lack accuracy and/or do not produce designs which represents realistically manufacturable mechanical parts. Some of them produce results which are not industrially feasible and/or which are industrially unrealistic.

Within this context, there is a need for an improved method for designing a 3D modeled object representing a mechanical part formed in a material having an anisotropic behavior with respect to a physical property.

SUMMARY

It is therefore provided a computer-implemented method for designing a 3D modeled object. The 3D modeled object represents a mechanical part formed in a material having an anisotropic behavior with respect to a physical property. The method comprises providing a 3D finite element mesh and data associated to the 3D finite element mesh. The data associated to the 3D finite element mesh includes a plurality of forces and boundary conditions. The plurality of forces forms multiple load cases. The method further comprises optimizing an orientation field distributed on the 3D finite element mesh with respect to an objective function. The objective function rewards orientation continuity with respect to the physical property. The optimizing is based on the 3D finite element mesh and on the data associated to the 3D finite element mesh.

The method may comprise one or more of the following:
the objective function depends on angle variables defined on the 3D finite element mesh, the angle variables describing orientations each on a respective element of the 3D finite element mesh;
the objective function is a non-convex function and the optimizing comprises applying a non-convex sensitivity based optimization method;

the non-convex sensitivity based optimization method has an angular iteration step, the angular iteration step being initialized at a value larger than 30° and lower than 90°;

the angular iteration step decreases at each iteration of the non-convex sensitivity based optimization method;

the optimizing comprises, at each iteration of the non-convex sensitivity based optimization method, filtering the orientation field;

the filtering of the orientation field comprises, for each element of the 3D finite element mesh, filtering the angle variables describing an orientation on the element;

the filtering of the angle variables comprises:
mapping the angle variables onto a 3D orientation vector expressed in Cartesian coordinates;
filtering the 3D orientation vector; and
mapping the filtered 3D orientation vector back onto angle variables;

the filtering of the 3D orientation vector comprises computing a linear combination of other 3D orientation vectors, the contribution of each other 3D orientation vector in the linear combination being a decreasing function of a distance between an element of the finite element mesh corresponding to the other 3D orientation vector and an element of the finite element mesh corresponding the 3D orientation vector;

the decreasing function quantifies a difference between a predefined radius and the distance;

the predefined radius is larger than 1.5 element, larger than 2 elements or larger than 3 elements; and/or the anisotropic behavior is an orthotropic behavior.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments will now be described, by way of non-limiting example, and in reference to the accompanying drawings, where.

DETAILED DESCRIPTION

Figure 1:
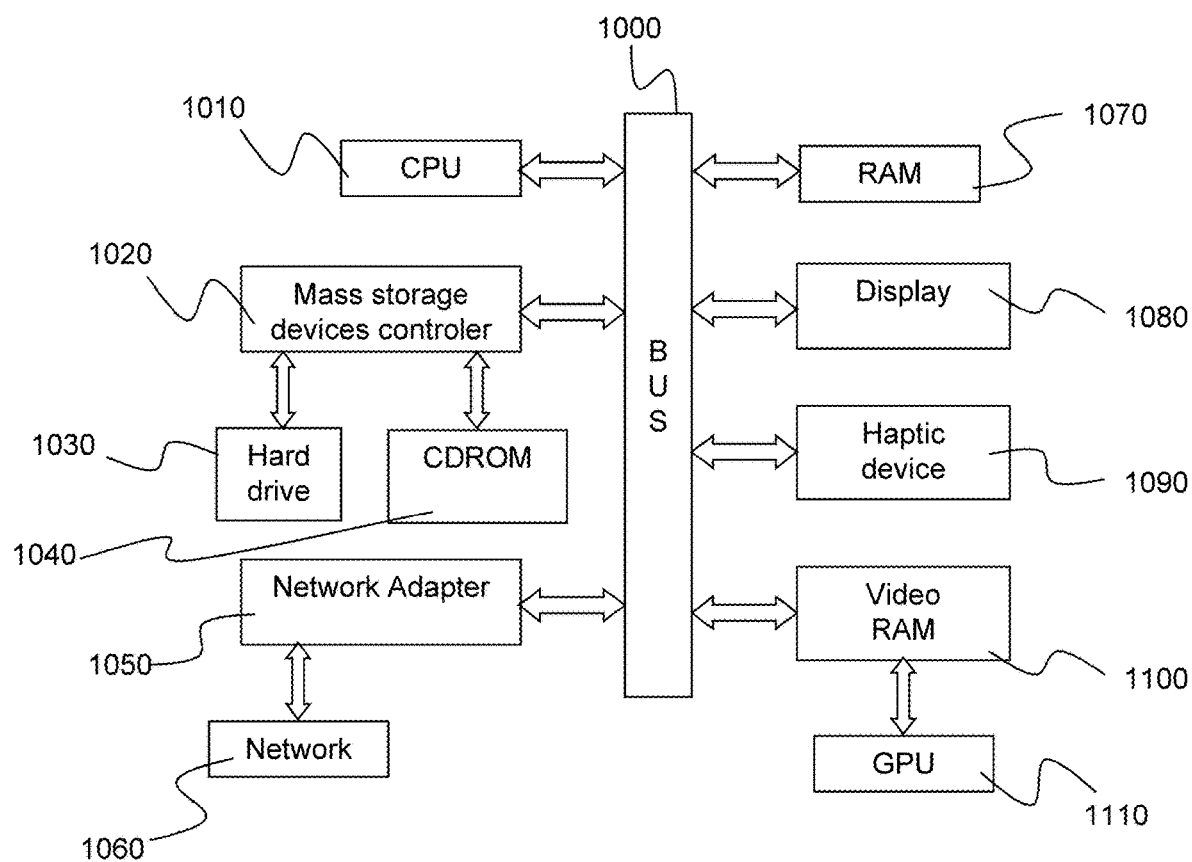
FIG. 1 shows an example of the system.

It is therefore provided a computer-implemented method for designing a 3D modeled object. The 3D modeled object represents a mechanical part formed in a material having an anisotropic behavior with respect to a physical property. The method comprises providing a 3D finite element mesh and data associated to the 3D finite element mesh. The data associated to the 3D finite element mesh includes a plurality of forces and boundary conditions. The plurality of forces forms multiple load cases. The method further comprises optimizing an orientation field distributed on the 3D finite element mesh with respect to an objective function. The objective function rewards orientation continuity with respect to the physical property. The optimizing is based on the 3D finite element mesh and on the data associated to the 3D finite element mesh.

This constitutes an improved method for designing a 3D modeled object representing a mechanical part formed in a material having an anisotropic behavior with respect to a physical property.

Notably, the method optimizes an orientation field distributed on the 3D finite element mesh. The orientation field represents a field of orientations of the physical property for the material forming the mechanical part. The method optimizes the orientation field with respect to an objective function. In other words, the method determines a representation of the field of orientations (i.e. the optimized orientation field) of the physical property for the material forming the mechanical part which is as much as possible compliant with the objective function. The objective function rewards orientation continuity, thereby the optimized orientation field tends to be continuous. Furthermore, the optimizing is based on the plurality of forces, which represent forces exerted on the mechanical part and which form constraints on the orientation field to optimize. In other words, the method determines a representation of field of orientations (i.e. the optimized orientation field) of the physical property for the material which tends to be continuous as wells compliant with the plurality of forces. Notably, the orientations of the optimized field tend to continuously align with the dominant directions of the forces. This improves the mechanical part's physical performances in response to the forces. This is particularly and objectively relevant in industrial design.

As a matter of fact, optimizing the field of orientations of the physical property for the material as does the method is particularly relevant for designing the mechanical part, as the material has an anisotropic behavior with respect to the physical property. Indeed, the physical property varies according to the direction/orientation within the material. Thus, when designing a 3D modeled object representing a mechanical part formed in such a material, optimizing the field of orientations of the physical property for the material improves realism of the design. In other words, it yields a 3D modeled object which is a realistic 3D visual representation of the mechanical part as it will be in the real world, i.e. once manufactured. Eventually, this allows the designed 3D modeled object to be manufactured in the real world.

The method may notably design 3D modeled objects representing continuous fiber manufactured parts (also possibly referred to as "structures"), for example formed in composites or laminates. Examples of such parts are parts manufactured by continuous fiber 3D printing, continuous fiber winding, or continuous fiber tape laying. Such parts are widely present in industries such as automotive, wind, aerospace and consumer goods. The optimized orientation field for such a continuous fiber design (i.e. a 3D modeled object representing a continuous fiber manufactured part) directly define the material orientations of the anisotropic (e.g. orthotropic) constitutive materials applied in a given manufacturing process for manufacturing the part represented by the 3D modeled object. The material orientations of the anisotropic (e.g. orthotropic) constitutive material play a major role in the physical performances and characteristics of the manufactured part when being a single component and/or when being a subcomponent assembled in a full structure, e.g. for stiffness, strength, stability, robustness, dynamics, heat conduction, or magnetic fields. In that respect, the method improves the design of a 3D modeled object representing a continuous fiber manufactured part as the orientation field optimized by the method tends to be continuous and has orientations which tend to align with the dominant directions of the forces. This results in fibers which tend to align with the dominant directions of the forces, and which tend to be continuous, the method thereby yielding a 3D modeled object representing a continuous fiber manufactured part which exhibits improved physical performances when complying with the plurality of forces which are exerted on it.

Furthermore, as previously said, the optimized orientation field tends to comply as much as possible with the forces exerted on the mechanical part, and the orientations tend to continuously align with the dominant directions of the forces. The plurality of forces form multiple load cases. As known per se in the field of industrial design, a load case is a set of one or more forces exerted at the same time on the mechanical part. Forces form multiple load cases when there exists two or more sets, each of one or more of these forces, which are not applied at the same time on the mechanical part, and which cannot accumulate/compensate each other. By optimizing the orientation field based on a plurality of forces forming multiple load cases and such that the orientations tend to comply with the load cases and to align with their dominant directions, the method allows to design realistically a 3D modeled object subject to multiple load cases. This ability of the method to handle multiple load cases is an improvement in industrial design, as only handling one load case would yield a 3D modeled object representing a part which would not be industrially feasible. Indeed, in the real world, mechanical parts are in practice subject to multiple load cases.

Moreover, the method may be performed in a topology optimization context.

For example, the method may be performed on a topologically optimized 3D modeled object, i.e. a 3D modeled object resulting from a topology optimization process/method/program. As known per se from the field of mechanical design, topology optimization aims at designing a 3D modeled object representing a mechanical part which exhibits improved mechanical performances in response to forces exerted on it. The topology optimization takes as input a finite element mesh, the forces, and space and/or mechanical constraints on the mechanical part. The topology optimization then determines an optimized distribution of the material forming the mechanical part in order for the mechanical part to achieve improved physical performances in response to the forces. In other words the topology optimization outputs a modeled object representing a mechanical part formed in a material exhibiting such improved physical performances. For example, the mechanical part may exhibit an improved mechanical stiffness. The method may be performed on such a 3D modeled object. As a result, the method takes as input a 3D modeled object having an optimized distribution of the material with respect to forces exerted on it and constraints. The method then optimizes the orientations of the physical property on the modeled object with respects to the plurality of forces (which may or may not be different from the forces pertaining to the topology optimization), as previously discussed. In other words, the 3D modeled object outputted by the method may exhibit an optimized distribution of the material forming the mechanical part with respect to forces exerted on it, as well as a relatively continuous orientation field of the physical property for the material with respect to the same or other forces. Moreover, all of this amounts to say that the method treats the variable(s) pertaining to topology optimization (i.e. the distribution of material) and the variable(s) pertaining to orientation optimization (i.e. the orientation field) separately and independently. This separation of the variables allows to use various techniques of topology optimization for providing the input 3D modeled object, such as any technique of topology optimization that features additional constraints like a geometrical local volume constraint (e.g. for enforcing porosity).

In yet other examples, the method may perform a topology optimization as well as the orientation field optimization. In such examples, the physical property is stiffness. In such a case, the method determines both a distribution of material that allows the mechanical part to exhibit improved stiffness in response to the plurality of forces as well as continuous orientations of the stiffness for the material, which align with the forces' dominant directions, thereby further improving stiffness.

Therefore, where the method is integrated in a topology optimization context, the method provides a choice to optimize both the orientation field and the density field simultaneously (i.e. when the method performs the topology and orientation optimizations together) or non-simultaneously (e.g. when the method performs the orientation optimization after the topology optimization). This is notably allowed by the orientations and densities forming separate variable fields having each its own sensitivity.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object designed by the method may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

In fact, the method designs modeled objects which are three-dimensional. The method is thus for solid modeling, i.e. the method yields a solid (e.g. 3D closed volume) which represents the mechanical part in 3D as it is in the real world once manufactured. The method thus belongs to the field of manufacturing CAD, as the method does not perform a mere 2D design of an object that will never be manufactured in the industry, but outputs a solid representing a 3D mechanical part, the output being suitable for use in subsequent steps of a manufacturing process (e.g. further design actions, tests, simulations and/or manufacturing).

The method is for designing a 3D modeled object which represents a mechanical part formed in a material having an anisotropic behavior with respect to a physical property.

The physical property may be any physical property. For example, the physical property may be any one of the stiffness, the strength, the stability, the robustness, the dynamics, the heat/thermal conduction, the magnetism/magnetic fields, the electrical conduction, the dielectrics, the diffusion or the flow in porous media.

The material forming the mechanical part has an anisotropic behavior with respect to the physical property, i.e. the physical property for the material is directionally dependent (i.e. changes depending on the direction). In other words, the physical property changes when measured from different directions. The anisotropic behavior may be an orthotropic behavior, i.e. the material has three orthogonal planes of symmetry and the physical property for the material differs along three principal directions. The material may be simply referred to as "anisotropic material", for conciseness.

In examples where the physical property is stiffness, the material has an anisotropic behavior with respect to the stiffness when the stiffness of the material is directionally dependent. In other words, the stiffness of the material is not the same depending on the direction in which it is measured. In case the material has an orthotropic behavior with respect to the stiffness, the material has three main/principal directions of stiffness, including a direction of greater stiffness.

In examples where the physical property is thermal/heat conduction, the material has an anisotropic behavior with respect to the thermal/heat conduction when the thermal/heat conduction within the material is directionally dependent. In other words, the material conducts heat differently depending on the direction. In case the material has an orthotropic behavior with respect to the thermal/heat conduction, the material has three main/principal directions of thermal/heat conduction, including a direction of greater thermal/heat conduction.

In examples where the physical property is flow in a porous media, the material has an anisotropic behavior with respect to the flow when the flow within the material is directionally dependent. In other words, the fluid flows through the material differently depending on the direction. In case the material has an orthotropic behavior with respect to the flow, the material has three main/principal directions of flow, including a direction of greater flow.

Figure 2:
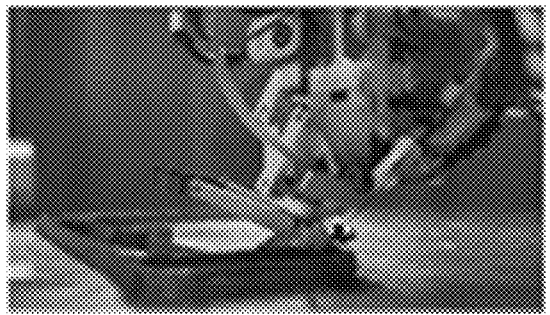
FIGS. 2, 3, 4, 5, 6, 7, 8, 9, 10, 11, 12, 13, 14 and 15 illustrate the method.
Figure 3:
Figure 4:
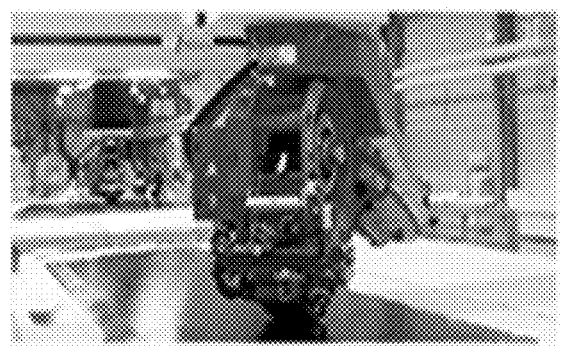

The mechanical part may be any mechanical part formed in an anisotropic material, for example an automotive or aerospace part formed in composites or laminates. In examples, the mechanical part is a continuous fiber manufactured part/structure. In examples of these examples, the mechanical part may notably be a continuous fiber structure manufactured by continuous fiber 3D printing, continuous fiber winding, or continuous fiber tape laying. Such a mechanical part is widely present in industries such as automotive, wind, aerospace and consumer goods. FIGS. 2 to 4 show examples of such a mechanical part. FIG. 2 shows a continuous fiber structure manufactured by continuous fiber 3D printing. FIG. 3 shows a continuous fiber structure manufactured by continuous fiber winding. FIG. 4 shows a continuous fiber structure manufactured by continuous fiber tape laying.

The method is for designing the 3D modeled object via orientation optimization. "Via orientation optimization" means that the method includes the optimizing of the orientation field. The optimizing of the orientation field may thus simply be referred to as "the orientation optimization" in the following. The method thus comprises providing inputs to the orientation optimization, for example via user-interaction.

The inputs of the orientation optimization include a 3D finite element mesh, also referred to as 3D FEM for conciseness. The 3D FEM represents the space containing the 3D modeled object to be designed. The 3D FEM may be regular or irregular. A regular 3D FEM allows easier computations during the orientation optimization. The 3D FEM may be of any type, for example with each finite element being a tetrahedron or a hexahedron. Providing the 3D FEM may comprise defining a design space and a meshing of the design space. The method may comprise displaying the 3D FEM to the user, and, by the user, defining other inputs of the topology optimization, e.g. including graphical user-interaction on the displayed FEM.

By "graphical user-interaction" with respect to defining an element, it is hereby meant any user-interaction where the designer employs a haptic system (e.g. a mouse or a touch device such as a sensitive/touch screen or a sensitive/touch pad) to activate one or more locations of the display unit and where the element is to be positioned. Activating a location of a scene may comprise positioning thereon the cursor of a mouse or performing a touch thereon. Substantially real-time after the activation, a representation of the defined element may be displayed.

The inputs of the orientation optimization further comprise data associated to the FEM and which depend on the mechanical part that the user wants to design.

These associated data may include parameters related to the material, in other words data representing the material in which the mechanical part is formed. These material parameters may in particular represent physical characteristics of the material, e.g. characteristics of the material with respect to the physical property. The material parameters may for example relate to constitutive law of the material with respect to the physical property. For example, the material parameter may include any physical quantity pertaining to the constitutive law. In examples, the user may specify a material (e.g. laminates and/or composites, such as woods, glass fibers, carbon fibers, ceramic matrix material or alumina matrix material), for example by selection from a list, and/or the system may determine automatically the material parameters and/or propose selection thereof to the user, for example based on one or more formulas and/or on a database.

The constitutive law is a matrix C which provides a constitutive relation representing the material's anisotropic behavior. The constitutive relation may be expressed as follows: $\sigma = C\epsilon$, where $\sigma$ and $\epsilon$ are two vectors each representing a physical quantity involved in the constitutive relation.

In examples where the physical property is the stiffness, the constitutive law C is the stiffness matrix, and the vectors σ and ε represent respectively the stress and the strain, as known per se from the field of mechanics. C depends on the Young's moduli, on Poisson's ratio and on Shear moduli, as known per se from the field of mechanics. The material parameters may include these moduli and ratios. In examples of these examples, the anisotropic behavior is an orthotropic behavior, and the matrix C is defined as the inverse of the following matrix:

$$\begin{pmatrix} \frac{1}{E_1} & \frac{-v_{21}}{E_2} & \frac{-v_{31}}{E_3} & 0 & 0 & 0 \\ \frac{-v_{12}}{E_1} & \frac{1}{E_2} & \frac{-v_{32}}{E_3} & 0 & 0 & 0 \\ \frac{-v_{13}}{E_1} & \frac{-v_{23}}{E_2} & \frac{1}{E_3} & 0 & 0 & 0 \\ 0 & 0 & 0 & \frac{1}{G_{12}} & 0 & 0 \\ 0 & 0 & 0 & 0 & \frac{1}{G_{13}} & 0 \\ 0 & 0 & 0 & 0 & 0 & \frac{1}{G_{23}} \end{pmatrix},$$

where $E_i$ is Young's modulus in direction i, $v_{ij}$ is Poisson's ratios between direction i and direction j, and $G_{ij}$ is the Shear modulus between direction i and direction j.

In examples where the physical property is the electrical conduction, the constitutive law C is the electrical conductivity, and the vectors σ and ε represent respectively the electrical field and the electrical current, as known per se from the field of electricity.

In examples where the physical property is the dielectrics, the constitutive law C is the electric permittivity, and the vectors σ and ε represent respectively the electrical field and the electrical displacement, as known per se from the field of electricity.

In examples where the physical property is the magnetism, the constitutive law C is the magnetic permeability, and the vectors σ and ε represent respectively the magnetic field and the magnetic induction, as known per se from the field of magnetism.

In examples where the physical property is the thermal conduction, the constitutive law C is the thermal conductivity, and the vectors α and ε represent respectively the temperature gradient and the heat flux, as known per se from the field of thermal engineering.

In examples where the physical property is the diffusion, the constitutive law C is the diffusivity, and the vectors σ and ε represent respectively the concentration gradient and the particle flux, as known per se from the field of diffusion.

In examples where the physical property is the flow in porous media, the constitutive law C is the fluid permeability, and the vectors α and ε represent respectively the pressure gradient and the weighted fluid velocity, as known per se from the field of fluid mechanics.

The associated data may further include a global quantity constraint. The global quantity constraint is relative to a global quantity of the material in the 3D FEM. In other words, the global quantity constraint restricts values of the total quantity of the material in the whole 3D FEM. The global quantity constraint may for example be provided as a boundary of the fraction of the (whole) 3D FEM which can be filled with the material, for example an upper bound for said fraction. Alternatively, the global quantity constraint may rather than a boundary provide a value which has to be reached. The orientation optimization may however optimize an objective function which tends to use as much material as available in the optimized result, rendering such an equality constraint equivalent to an upper bound constraint. In all cases, the fraction may be a volume fraction (also referred to as GVC in such a case, as in "Global Volume Constraint"). In other examples, the global quantity constraint may involve values representing weight of the material.

The data associated to the 3D finite element mesh include data representing conditions of use of the mechanical part and based on which the orientation optimization is able to optimize orientations of the physical property for material forming the mechanical part model in view of such foreseen use.

The associated data notably include a plurality of forces forming multiple load cases. In other words, the associated data include vectors (e.g. with magnitudes in Newtons or in a multiple thereof) each applicable and linked to one or more finite elements of the 3D FEM. These forces represent partially the loads to which the mechanical part will be subject when used. In other words, for each one or more finite elements of the 3D FEM for which a respective force is present in the data, the data represent the fact that material of the mechanical part at locations corresponding to said one or more finite elements will be subject to corresponding loads. But since a mechanical part may theoretically be subject to an infinite number of loads, not all loads are represented by the forces present in the data. The forces only represent a restriction of the whole set of loads, for example most significant ones and/or most representative ones. The forces may be determined for each modeling problem and may be chosen to be the largest (i.e. highest magnitude) forces the object may be subject to during its lifetime, since these forces tend to have the most important effects on the structure, e.g. cause the largest deformations and mechanical stresses. The plurality of forces form multiple load cases, i.e. the forces a grouped into sets of one or more forces called load cases. As known per se from the field of manufacturing CAD, a load case is a set of one or more forces exerted at the same time on the mechanical part. Forces form multiple load cases when there exists two or more sets, each of one or more of these forces, which are not applied at the same time on the mechanical part, and which cannot accumulate/ compensate each other. In examples, the user may select via graphical user-interaction finite elements of the 3D FEM, and then specify a force applicable thereto.

The associated data also include boundary conditions. A boundary condition is a constraints on the boundary of the 3D modeled object. Each boundary condition applies and is linked to one or more finite elements of the mesh and represents a respective constraint on the boundary to which the mechanical part is subject in use. In other words, each boundary condition represents the fact that material of the mechanical part at locations corresponding to said one or more finite elements is subject to a constraint on its displacement, for example using Dirichlet boundary conditions. An element may have its displacement constrained (among others) along a plane, along a curve, along/around an axis, or to/around a point, and/or its displacement may be only constrained only in translation, only in rotation, or in both translation and rotation. In the case of a displacement constrained to a point both in translation and rotation, the element is fixed in 3D space and is said to be "clamped". An element may however have its displacement constrained in translation along a plane but move freely on said plane (e.g.

if it belongs to an object mounted on a bearing), in translation along an axis but move freely on said axis (e.g. in a piston), or in rotation around an axis (e.g. joints of a robotic arm).

In examples where the physical property is the heat conduction, the finite element analysis (FEA) predicts the temperature of each element in the part. In these examples, the boundary conditions could be to lock a subset of elements to a given temperature, therefore acting as what is commonly called a "heat sink". An example of these examples is when simulating the temperature of an electrical component during use. The microprocessor in the component produces heat which spreads in the component and is "evacuated" at the heat sink. Note that just like in stiffness where boundary conditions constrain the displacement of elements, in heat conduction, the boundary conditions constrain the temperatures of elements.

In examples, the boundary conditions represent all the constrained boundaries. In other words, for each finite element of the 3D FEM which is intended to eventually contain material that is constrained (e.g. to remain fixed), a boundary (e.g. clamping) condition may be associated to integrate this fact in the orientation optimization. In examples, the user may select via graphical user-interaction finite elements of the 3D FEM, and then specify that boundary conditions are applicable thereto.

In examples, the one or more constrained boundaries of the mechanical part comprise or consist of one or more fixed boundaries (i.e. the material at said one or more boundaries cannot move), and the corresponding one or more boundary conditions are clamping conditions.

The orientation optimization optimizes (e.g. automatically), based on the inputs, an orientation field distributed on the 3D finite element mesh with respect to an objective function. "Based on the inputs" means that the optimizing takes into account the inputs, including the 3D finite element mesh and the data associated to the 3D finite element mesh, when optimizing the orientation field. For examples, the optimizing takes into account the plurality of forces in such a way that the orientations of the optimized orientation field tend to align with the forces' dominant directions. The method may optimize the objective function itself, i.e. may solve an optimization problem with respect to the objective function having the orientation field as free variable. The optimization problem may for example consists in minimizing the objective function with respect to the constraints. The orientation field is a set of orientations each on a finite element of the mesh, an orientation consisting for example in a set of (e.g. two) direction variables (e.g. angles). The orientation field is distributed on the 3D finite element mesh in that each finite element of the 3D finite element mesh comprises an orientation. The orientation field thus forms a vector field over the 3D finite element mesh. The orientation field represents a field of orientations of the physical property for the material.

The orientation optimization optimizes the orientation field with respect to the objective function. The objective function depends on (i.e. is a function of) the orientations on the finite elements, and the orientation optimization optimizes (e.g. minimizes) the value of the function by modifying the orientations. The objective function may represent any physical characteristic to be optimized with respect to the physical property.

For example, if the physical property is the stiffness, the objective function may represent the compliance of the mechanical part, which is the inverse of the stiffness. The compliance encapsulates the amount of deformation of the structure considering specified load cases and fixed boundary conditions. Therefore, when the optimizing minimizes the compliance, this corresponds to maximize the stiffness of the design for a given mass. In such a case, the method may thus determine an optimized orientation field which tends to be continuous and which is such that the orientations align with the forces' dominant directions. This results in that the mechanical part exhibits improved stiffness performances in response to the load cases applied on it.

In other examples where the physical property is the thermal conduction, the function may be the thermal conductivity. The thermal conductivity encapsulates the amount of thermal diffusion within the structure considering specified load cases and fixed boundary conditions. The optimizing tends to maximize thermal conductivity in such examples. In other words, the method yields an orientation field which tends to be continuous and for which the orientations tend to align with the temperature gradients directions. This results in that the mechanical part diffuses heat in certain orientations. In examples of these examples, the optimization of the orientation field maximizes heat diffusion to lower the temperature of the mechanical part. This may be useful to prevent electrical components from overheating.

The objective function rewards orientation continuity with respect to the physical property. In other words, modifying the orientations to tend to optimize (e.g. minimize) the value of the objective function results in that the orientation field tends to be continuous with respect to the physical property. By "continuous", it is to be understood that the orientation field, which is a vector field, has or at least tends to have a certain continuity, for example a G1 continuity. The concept of G1 continuity is known from the field of mathematics and is not further detailed. In other words, orientations of the physical property for the material tends to form a continuous orientation field when optimizing the value of the objective function.

The free variables of the objective function comprise variables representing the orientations distributed on the 3D FEM, as previously discussed. The orientation optimization thus varies/modifies the orientation in each finite element of the 3D FEM to optimize the objective function, by modifying the variables representing the orientation. The orientation optimization thus yields (e.g. outputs) the orientation field formed by the modified orientations, the orientation field tending to be continuous and to align with the dominant directions of forces, as previously discussed. The free variables of the objective function may further include the distribution (i.e. layout) of quantity (e.g. volume fraction) of material over the 3D FEM. The optimization may in such cases vary the material quantity (e.g. volume fraction) in each finite element of the mesh to optimize the objective function. Alternatively, the distribution of quantity of material over the 3D FEM may be a fixed variable of the objective function instead of a free variable. In such a case, the optimization may only vary the orientations on the finite elements, and not the material quantity in the finite elements. The objective function may depend on the material parameters (i.e. fixed variables of the objective function may involve the material parameters) and the optimization may be performed under constraint, including the global quantity constraint. The free variables of the orientation optimization are also referred to as the "design variables".

The orientation optimization may in any case be performed according to any algorithm, for example an iterative algorithm. The method may in examples further comprise computing (e.g. automatically) a 3D modeled object, such as a boundary representation (B-Rep) model, based on the optimized orientation field, e.g. and on the distribution of material. For example, the method may compute swept volumes based on and along series of finite elements resulting from the optimization. Such a 3D modeled object represents the mechanical part having optimized orientations of the physical property for the material, that is orientations tending to form a continuous orientation field and tending to align with the dominant directions of forces.

The method may integrate steps of a general optimization orientation workflow, such steps being now discussed through an example of the general topology optimization workflow.

Figure 5:
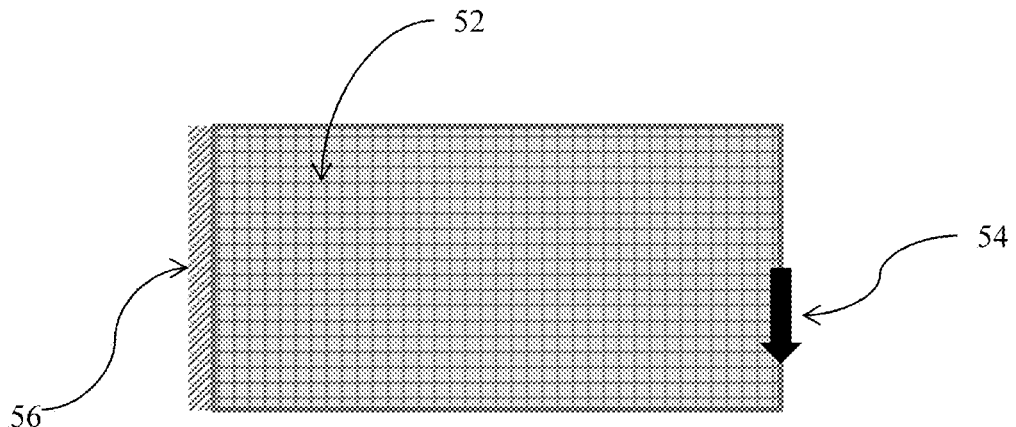

As shown in FIG. 5 which illustrates specification of an orientation optimization scenario, the general orientation optimization workflow requires as input a design space 52 (which is here subdivided in small square elements), a set of load-cases, an example 54 of which being shown in FIG. 5, and boundary conditions 56 (locations where the design is constrained for deformations, e.g. "being clamped", here on the whole left side of the design space 52). Additional parameters can be defined, as previously discussed.

The design workflow may exclude provision of an initial geometry except from the design space definition, in case the goal of orientation optimization is to generate an optimized design from an empty canvas (which is the design space). Alternatively, the design workflow may comprise the provision of an initial geometry of the modeled object. The initial geometry may for example result from a topology optimization, the goal of orientation optimization being in this case to optimize the orientations of the physical property for the topologically optimized initial geometry.

The output of the general topology optimization workflow is the geometry of the 3D modeled object of which orientations of the physical property comply as much as possible with the input specification.

Figure 6:
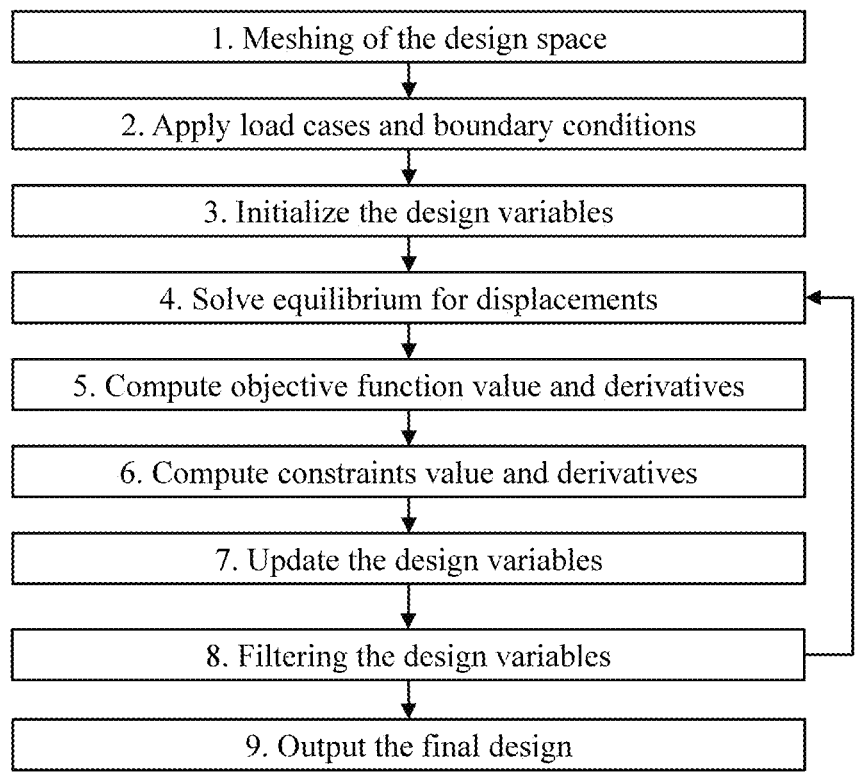

As shown in FIG. 6, the general orientation optimization workflow may in examples follow nine steps described in the following:

1. Meshing of the Design Space

Create a discretization of the design space as shown in FIG. 5. This means subdividing the space into small simple connected elements e.g. tetrahedrons, hexahedrons. These small elements will later serve as both the Finite Element Mesh for the simulation and as Design Variables for the optimization.

2. Apply Load Cases and Boundary Conditions

Here, the general orientation optimization workflow may take the plurality of forces and clamped boundary conditions for a given input specification and apply them to the nodes of the 3D FEM. FIG. 5 shows a mesh where the design space is subdivided into regular square elements. The nodes on the left side are clamped (fixed in 3D space) and a downward force is applied on the middle right hand side of the design space.

3. Initialize the Design Variables

Figure 7:
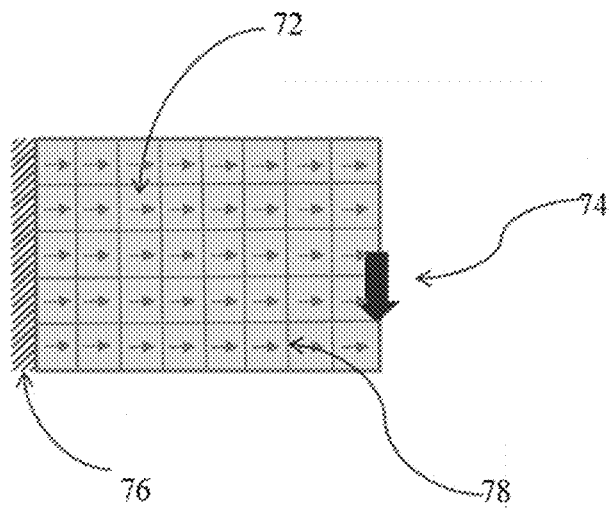

Each element has a given orientation defining the orientation of the physical property for the material on the element. The orientation may comprise a specification of one or more directions of the physical property for the material. Where the anisotropic behavior is an orthotropic behavior, the specification may consist in angles describing a main direction of the physical property for the material. FIG. 7 shows mesh where the design space 72 is divided into regular square elements. The nodes 76 on the left side are clamped and a downward force 74 is applied on the middle right hand side of the design space. FIG. 7 further shows the initialized orientation field 78, where each orientation is represented by an arrow on a corresponding finite element. Each element also has a given relative density value defining whether it is empty or full of material, respectively defined by the values "0" and "1". The general topology optimization workflow may allow the elements to take any value between 0 and 1. This is often referred to as relaxation.

4. Solve for Equilibrium

At this point the general orientation optimization workflow may have a complete defined finite element model being meshed and attached with forces and boundary conditions, and where each element has an orientation and a relative density value. Thereby, the general orientation optimization workflow may assemble a global physical property matrix, which encapsulates the constitutive law of the material, and solve for the nodal displacements of the orientation equilibrium. In other words, the general orientation optimization workflow may compute the orientation field of the structure in its current state for the applied forces and boundary conditions.

5. Compute Objective Function Value and Derivatives

An objective function which may be used in the orientation optimization may be based on the constitutive law. Such a function captures the physical performances of the structure with respect the physical property and connects the plurality of forces with their effects on the structure with respect to this physical property. Moreover, due to the large number of design variables in the process, the optimization may be performed with a gradient-based method. Therefore, the general orientation optimization workflow may also compute the derivatives of the objective function with respect to each design variable. The general orientation optimization workflow may compute how the relative orientation of each element should be changed to improve the physical performances of the mechanical part with respect to the physical property and fulfilling the constraints. This may be performed using the well-known and classic "Adjoint Sensitivity Analysis". Additionally, after the derivatives are calculated, these derivatives may be smoothed through a filtering to improve numerical stability. The general orientation optimization workflow may reduce erroneous checkerboard patterns and introduce a length scale in the optimization, such that it is well-defined.

6. Compute Constraint Values and Derivatives

A constraint function in the general orientation optimization workflow may include the global volume fraction of the structure. Such GVC defines the maximum material volume allowed to be used and therefore, the maximum mass of material constituting the designs. Consequently, the optimizer has to find the optimized orientation field of the physical property for this mass in the design space. The derivatives for this constraint with respect to the orientation variables are zero, as the volume does not depend on the direction. The derivatives for this constraint with respect to the density are equal to the elemental volume and if the elements are equal in size, then the derivatives are constant for each element and therefore trivial to compute.

7. Update the Design Variables Using Mathematical Programming

When the values of the objective function and the constraint are known as well as their derivatives, then the general optimization workflow may use a gradient-based mathematical programming to modify the relative orientation on each element to improve continuity of the orientation field without violating the specified constraints. The simplest and most commonly used mathematical programming for this problem is the so-called Optimality Criteria (OC). A more general mathematical programming is the Method of Moving Asymptotes (MMA, first described in "The method of moving asymptotes—a new method for structural optimization", Krister Svanberg, International Journal for Numerical Methods in Engineering, February 1987, which is incorporated herein by reference). The MMA can notably handle multiple nonlinear constraints, which makes it particularly efficient for in the case of the method. However, other mathematical programming algorithms could also have been used. Once the relative orientation of each element has been modified by the mathematical programming, and the given modified design in the optimization process is not yet converged then we loop back to the step 4.

8. Various Filtering the Design Variables

Filtering the design variables designates any method suitable for regularizing the design variables, i.e. improving continuity and/or regularity of the design variables. The filtering may be carried out during the update of the design variables, i.e. at step 7, for example at each iteration of the mathematical programming. Alternatively or additionally, the filtering may be carried out after step 7, i.e. once the design variables are updated.

9. Output the Final Design

Once convergence is achieved, the general orientation optimization workflow may present a finalized design in the design space where each element has an optimized relative orientation. The general orientation optimization workflow may now present the geometry of the optimized design which is the output of the general orientation optimization workflow.

The optimizing of the orientation field according to the method may implement all steps of this general orientation optimization workflow or at least a part of them.

In examples, the objective function depends on angle variables defined on the 3D FEM. In other words, the objective function is a function of the angle variables. The angle variables describe orientations for the physical property each on a respective element of the 3D FEM. In other words, the angle variables form a set of (e.g. two) angles, each orientation of the orientation field corresponding to a value of this set of angles (i.e. a set made of values of the angles). Angle variables form a simple and efficient manner of describing the orientations. These examples are now discussed.

The angle variables are design variables each describing an angle. The angle variables may form a couple of angles. In examples, notably in examples where the anisotropic behavior is an orthotropic behavior, the angles describe the main direction of the physical property for the material. In examples, the angle variables form a type of spherical coordinate system. Specifically, let v(x,y,z) be a vector representing an orientation of a given finite element in cartesian coordinates. It is to be noted that the three cartesian directions/axis of coordinates may correspond to the three orthotropic directions of the material in examples where the material has an orthotropic behavior with respect to the physical property. v(x,y,z) is expressed by means of two angle variables a, also referred to as an azimuth, and θ, also referred to as an elevation. In other words, v(x,y,z) is expressed as a function of both θ and α. For example, the orientation may be expressed as (θ,α). The constraints on the angle variables are that both θ and a must belong to $]-2\pi;2\pi[$. One of the axis of the cartesian coordinates system is described by the equation $(\alpha,\theta)=(0,0)$. Let the Y-axis be this axis, this choice being a pure convention: the X-axis or the Z-axis could also perfectly be chosen. In such a case, the mapping between the cartesian coordinates (x,y,z) and the spherical coordinates (θ,α) is expressed by the following relations:

$$\begin{cases} x = -\sin(\theta) \\ y = \cos(\theta)*\cos(\alpha) \\ z = \cos(\theta)*\sin(\alpha) \end{cases} \Leftrightarrow \begin{cases} \alpha = \arctan2(z, y) \\ \theta = -\arcsin(x) \end{cases} \quad (1)$$

Figure 8:
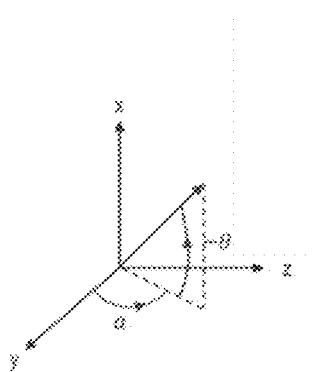

FIG. 8 shows a representation of an example of the coordinate system with the angle variables θ and α. Referring back to FIG. 6, the method may comprise, at step 3 of the optimization process, initializing the values of the angles θ and α for each element of the mesh. For a given element e of the mesh, the angles are noted $\theta_e$ and $\alpha_e$.

Still referring to FIG. 6, at step 4 of the optimization process, the method may use the angle variables to compute the objective function. Specifically, the method may comprise defining a series of transformation $T^{-1}=T_\alpha^{-1}T_\theta^{-1}$, where, for each finite element e:

$$T_\alpha^{-1}(\alpha_e) = \begin{pmatrix} 1 & 0 & 0 & 0 & 0 & 0 \\ 0 & c^2 & s^2 & 0 & 0 & -2cs \\ 0 & s^2 & c^2 & 0 & 0 & 2cs \\ 0 & 0 & 0 & c & -s & 0 \\ 0 & 0 & 0 & s & c & 0 \\ 0 & cs & -cs & 0 & 0 & c^2-s^2 \end{pmatrix} \text{ with}$$

$c = \cos(\alpha_e)$ and $s = \sin(\alpha_e)$ and $$T_\theta^{-1}(\theta_e) = \begin{pmatrix} c^2 & s^2 & 0 & -2cs & 0 & 0 \\ s^2 & c^2 & 0 & 2cs & 0 & 0 \\ 0 & 0 & 1 & 0 & 0 & 0 \\ cs & -cs & 0 & c^2-s^2 & 0 & 0 \\ 0 & 0 & 0 & 0 & c & -s \\ 0 & 0 & 0 & 0 & s & c \end{pmatrix} \text{ with}$$

$c = \cos(\theta_e)$ and $s = \sin(\theta_e)$.

Still referring to FIG. 6, at step 4 the method may then comprise defining, for each finite element e, a local physical property matrix $K_e$, which is of the type:

$$K_e(\rho_e,\alpha_e,\theta_e)=\rho_e^p K_e^0)(\alpha_e,\theta_e) \quad (2)$$

where $\rho_e$ is the density variable at the finite element e, where p is a penalization exponent, and where:

$$K_e^0(\alpha_e,\theta_e)=\iiint B^T T^{-1}(\alpha_e,\theta_e)CT^{-T}(\alpha_e,\theta_e)Bd\Omega \quad (3)$$

with Ω the set of the finite elements and B shape function derivatives matrix. Essentially, this matrix encompasses the fact that the behavior of an element depends on its shape, regardless of the physics considered. Specifically, a regular cube element will not behave the same way than a tetrahedral element, or a beam element. The penalization exponent is a well-known technique in topology optimization to encourage the optimization scheme to use preferentially density values of either 0 or 1 and avoid intermediate values (e.g. 0.4). The motivation being that a density of 0 is empty/void and a density of 1 is full/solid. However a density of 0.5 is not easy to physically interpret in a meaningful way (i.e. saying "half full" is ambiguous).

Still referring to FIG. 6, at step 4 the method may then comprise assembling a global physical property matrix by accumulating the local physical property matrix $K_e(\rho_e, \alpha_e, \theta_e)$ for each element, i.e. by performing the following operation:

$$K(\rho, \alpha, \theta) = \underset{e \in \Omega}{\wedge} K_e(\rho_e, \alpha_e, \theta_e). \quad (4)$$

$K(\rho, \alpha, \theta_e)$ Still referring to FIG. 7, at step 4, the method may comprise solving for the nodal displacement of the orientation equilibrium. To that aim, the method may solve a minimization problem of the type:

$$\min c(\rho, a, \theta) = (\sum_{i \in LC}) f_i^T u_i \quad (5)$$

$$\text{s.t.} \begin{cases} Vol \leq V_{max} \\ K(\rho, \alpha, \theta) u_i = f_i, \forall i \in LC \\ 0 < \rho_{min} \leq \rho_e \leq 1, \forall e \in \Omega \\ -2\pi \leq \alpha_e \leq 2\pi, \forall e \in \Omega \\ -2\pi \leq \theta_e \leq 2\pi, \forall e \in \Omega \end{cases}$$

where:
c is the objective function to optimize,
LC is the set of multiple load cases formed by the plurality of forces,
the $f_i$, i∈LC, are the load cases. Each $f_i$ is a matrix of which size equals 3 times the number of nodes in the 3D FEM, and describes a load case applied in each direction (i.e. each cartesian direction) for each node of the 3D FEM,
the $u_i$, i∈LC, are the nodal displacement vectors. Each $u_i$ is a matrix to of which size equals 3 times the number of nodes in the 3D FEM and describes the displacement in each direction (i.e. each cartesian direction) of each node of the 3D FEM in response to the load case $f_i$,
Vol is the volume of the mechanical part and $V_{max}$ is the maximal authorized volume for the mechanical part,
$K(\rho, \alpha, \theta) u_i = f_i$ is the state equation relating the nodal displacement vector $u_i$ to the forces forming the load case $f_i$. The method solves this equation for each load case $f_i$.

Still referring to FIG. 6, at step 5 of the optimization process, the method may compute the derivatives of the objective function as follows:

$$\frac{\partial c}{\partial \alpha_e} = -\rho_e^p u_e^T \frac{\partial K_e^0}{\partial \alpha_e} u_e, \text{ and}$$

$$\frac{\partial c}{\partial \theta_e} = -\rho_e^p u_e^T \frac{\partial K_e^0}{\partial \theta_e} u_e, \text{ with}$$

$$\frac{\partial K_e^0}{\partial \alpha_e} = \int \int \int B^T \left[ \frac{\partial T_\alpha^{-1}(\alpha_e)}{\partial \alpha_e} T_\theta^{-1}(\theta_e) C T_\theta^{-T}(\theta_e) T_\alpha^{-T}(\alpha_e) + \right.$$

-continued
$$\left. T_\alpha^{-1}(\alpha_e) T_\theta^{-1}(\theta_e) C T_\theta^{-T}(\theta_e) \frac{\partial T_\alpha^{-T}(\alpha_e)}{\partial \alpha_e} \right] B d\Omega$$

and $$\frac{\partial K_e^0}{\partial \theta_e} = \int \int \int B^T$$

$$T_\alpha^{-1}(\alpha_e) \left[ \frac{\partial T_\theta^{-1}(\theta_e)}{\partial \theta_e} C T_\theta^{-T}(\theta_e) + T_\theta^{-1}(\theta_e) C \frac{\partial T_\theta^{-T}(\theta_e)}{\partial \theta_e} \right] T_\alpha^{-T}(\alpha_e) B d\Omega.$$

The following can said about the angle variables. The method optimizes the orientation field in a multiple load cases context, as previously discussed. In these context, there are multiple different directions of forces, and the orientations cannot align with all of them at the same time. The above-discussed formulation (5) of an orientation problem with the angle variables alpha and theta allows to align the orientations with the dominant directions of forces.

Still referring to FIG. 6, at step 7 of the optimization process, in the previously-discussed examples where the objective function depends on the angle variables, the objective function may be a non-convex function. The constraints may also be non-convex functions. In such a case, the optimizing comprises applying a non-convex sensitivity based optimization method. The applying of the non-convex optimization method is part of step 7.

The function may be non-convex as it depends on the angle variables representing the orientation in each element. The function thus has a periodicity with respect to each angle variable. Now, the orientation optimization varies the angle variables within each element in order for the objective function to reach a global minimum (or maximum, in case the problem is to maximize the objective function) However, due to the periodicity of the function in angle variables, the function may have more than one local minimum. This complexifies step 7, as many standard mathematical programming methods for performing step 7 may modify the angle variables within each element until the objective function reaches a local minimum, instead of a global one. These standard mathematical programming methods may thus not be suitable for carrying out step 7. This is notably the case when the anisotropic behavior is an orthotropic behavior, the optimization problem (1) being in such cases non-convex.

However, the method circumvents these difficulties by performing a non-convex sensitivity based optimization method as at step 7, in order to vary the angle variables in each element so that the objective function reach a global minimum.

As known per se from the field of mathematical programming for optimization, the non-convex sensitivity based optimization method may involve a gradient descent along the angle variables, involving the derivatives of the objective function with respect to the angle variables. "Sensitivity based" notably refers to the fact that the optimization computes the derivatives of the objective function with respect to the angle variables for performing the gradient descent. As known per se, the gradient descent has an iteration step, also referred to as "step size". The iteration step is herein referred to as an "angular iteration step", as the descent is along the angle variables.

In examples, the angle iteration step is initialized at a value larger than 30° and lower than 90°. In other words step 7 may comprise a sub-step of initializing the angle iteration step at a value larger than 30° and lower than 90°, for example at a value equal or substantially equal to 45°. This allows to keep the optimization method from varying the angle variables in such a way that they would yield a local minimum of the objective function. Numerical experiments have indeed shown that such an initial value for the angle iteration step contributes to keeping the optimization method from varying the angle variables in such a way that they would yield a local minimum of the objective function. Notably, the initial angle iteration step is sufficiently large for the orientation variable to vary away from a local minimum.

The angle iteration step may be fixed, i.e. once initialized the angle iteration step is set once and for all. Alternatively, the angle iteration step may vary, e.g. at each iteration of the optimization method. In examples, the angle iteration step decreases at each iteration of the optimization method. In other words, the optimization may comprise, at each iteration, decreasing (e.g. automatically) the angle iteration step, e.g. by multiplying it by a fixed value such as 0.95. For example, if at iteration zero 0 the angle iteration step is 45, at iteration 1 it will be 0.95*45, and at iteration 2 it will be 0.95*0.95*45, and so on. In other words, the angle iteration step decreases exponentially. This allows the optimization method to iteratively narrow the scope of variation of the angle variables, so that ultimately they vary around a global minimum of the objective function and tend to reach it. Said otherwise, initializing the angle iteration step at a value between 30° and 90° and decreasing this value at each iteration step allows the following: when varying, the angle variables eventually approach a global minimum of the objective function, and these constraints on the angle iteration step tend to ensure that they will remain close to the global minimum, and eventually that they will tend to reach it. In yet other words, the varying angle variables do not "jump" from one local minimum to another during the non-convex optimization process.

Still referring to FIG. 6, at step 8 of the optimization process, the optimizing may comprise, at each iteration of the non-convex sensitivity based optimization method, filtering the orientation field.

Filtering the orientation field comprises filtering (i.e. regularizing) the orientations on each finite element. In other words, the filtering of the orientation fields regularizes the relative orientations on the finite elements of the 3D FEM. Although optimizing the objective function per se tend to yield an orientation field which is continuous in at least some cases, it may happen in other cases that the optimized orientation field does not feature a proper continuity, e.g. does not feature a G1 continuity. The filtering of the orientation field corrects this, or at least tends to, thereby improving efficiency and robustness of the method.

The filtering of the orientation field may comprise, for each element of the 3D finite element mesh, filtering the angle variables describing an orientation on the element. In other words, the filtering of the orientation field may directly filter the angle variables describing the orientation. This allows a simple and efficient integration of the filtering into the non-convex sensitivity based optimization method, which is performed in angle variables. It is to be understood that the filtering may be carried out simultaneously for each element of the 3D FEM.

Due to their periodicity and their interdependency, the angle variables describing the orientation on the element cannot be regularized separately, for example by using a simple convolution method on these variables. In examples, the method circumvent this difficulty as follows: the filtering of the angle variables comprises:

mapping the angle variables onto a 3D orientation vector expressed in Cartesian coordinates;
filtering the 3D orientation vector; and
mapping the filtered 3D orientation vector back onto angle variables.

Mapping the angle variables onto a 3D orientation vector, comprises transforming the set of angle variables describing the orientation on the element into a 3D vector expressed in Cartesian coordinates, for example according to the set of relations (1). Mapping the angle variables onto the 3D orientation vector expressed in Cartesian coordinates allows to perform any type of filtering/regularizing on the 3D orientation vector, as the Cartesian coordinates do not feature the periodicity or interdependency of the angle variables. Consequently, filtering the 3D orientation vector may be carried out by any suitable method for improving the relative continuity of orientation vectors forming the orientation field in cartesian coordinates. The 3D orientation vector, once filtered, is mapped back onto angle variables. Mapping the filtered 3D orientation vector back onto angle variables comprises transforming the filtered 3D orientation vector into a set of angle variables, e.g. according to the set of relations (1). This set of angle variables describes a filtered orientation on the element, for use in a subsequent iteration of the optimization method.

In examples, the filtering of the 3D orientation vector comprises computing a linear combination of other 3D orientation vectors. The contribution of each other 3D orientation vector in the linear combination is a decreasing function of a distance between an element of the finite element mesh corresponding to the other 3D orientation vector and an element of the finite element mesh corresponding the 3D orientation vector.

The other 3D orientation vectors may be any set of 3D orientation vectors relatively to which the 3D orientation vector is filtered. For example, the other 3D orientation vectors may comprise all other 3D orientation vectors, i.e. all the 3D orientation vectors which each represent an orientation in a finite element other that the finite element of which orientation corresponds to the 3D orientation vector. The other 3D orientation vectors may also comprise the 3D orientation vector. As known per se, in a linear combination of vectors, each vector has a contribution, which may also possibly be referred to as a "weight" or a "coefficient". Here the contribution of each said other 3D orientation vector is a decreasing function of a distance between an element of the finite element mesh corresponding to the other 3D orientation vector (i.e. the element of which orientation in Cartesian coordinates is represented by the other 3D orientation vector) and an element of the finite element mesh corresponding the 3D orientation vector (i.e. the element of which orientation in Cartesian coordinates is represented by the 3D orientation vector). Said otherwise, the closer the element corresponding to the other 3D orientation vector is to the element corresponding to 3D orientation vector, the more the other 3D orientation vector contributes in the linear combination. In yet other words, the filtering of the 3D orientation vector changes the 3D orientation vector into a linear combination of the other 3D orientation vectors, where the closer a vector is to the 3D orientation vector, the more it contributes in the linear combination.

The distance may be any distance, for example a 3D Euclidean distance. In examples, the decreasing function quantifies a difference between a predefined radius and the distance, which is a particularly simple and efficient way of filtering the 3D orientation vector. The radius may depend on the length scale that the manufacturing process for manufacturing the mechanical part is able to handle. By "predefined", it may be meant that the radius is set by a user, e.g. beforehand (i.e. at an initial stage of the method), e.g. based on manufacturing considerations (e.g. assembling, control and/or inspection easiness of the mechanical part). Alternatively, the predefined radius may be fixed, i.e. it may form a non-modifiable parameter of the method. Alternatively or additionally, the predefined radius may be larger than 1.5 element, larger than 2 elements, or larger than 3 elements. By "larger than 1.5 (resp. 2, resp. 3) elements", it may be meant that the elements of the 3D FEM are identical and have all a same size, and that the radius is larger than 1.5 (resp. 2, resp. 3) this size. Alternatively, the elements of the 3D FEM may have different sizes, in which case "larger than 1.5 (resp. 2, resp. 3) elements" may mean "larger than 1.5 (resp. 2, resp. 3) a mean size of the elements of the 3D FEM".

An example of the filtering of the 3D orientation vector is now discussed. Let $$v_i = \begin{pmatrix} x_i \\ y_i \\ z_i \end{pmatrix}$$

be the 3D orientation vector in cartesian coordinates resulting from the mapping of the angle variables on the $i^{th}$ element of the 3D FEM onto $v_i$. The filtering of $v_i$ comprises computing the filtered vector $v_{filtered,i}$ as the linear combination:

$$v_{filtered,i} = \sum_{j=1}^{N} \omega_{i,j} v_j, \quad (6)$$

where N is the number of finite elements in the 3D FEM, where the $v_j$ are the other 3D orientation vector and include $v_i$, and where for all j $\omega_{i,j}$ is the contribution of $v_j$ in the linear combination. $\omega_{i,j}$ is expressed by the following formula:

$$\omega_{i,j} = \frac{R - d(i, j)}{\sum_{k \in N_i} (R - d(i, k))}, \quad (7)$$

where R is the predefined radius, where d(i,j) is the Euclidean distance between the $i^{th}$ element and the $j^{th}$ element of the 3D FEM, and where $N_i$ is the set of finite elements of the 3D FEM whose Euclidean distance is strictly smaller than R.

As previously said, the method may be carried out in the context of topology optimization. This is now further discussed.

In examples, the method may be performed on a 3D modeled object which has already been optimized by a topology optimization. These examples are now discussed.

In these examples, the providing of the 3D FEM comprises the provision of an initial geometry of the modeled object, said geometry resulting from a topology optimization performed beforehand, i.e. before the method. The method may or may not comprise performing this topology optimization. For example, the provision of the initial geometry may comprise performing the topology optimization. Alternatively, the provision of the initial geometry may comprise retrieving the initial geometry from a (e.g. distant) memory where it has been stored subsequent to the topology optimization.

As known per se from the field of industrial design, topology optimization is a computer-implemented technique bridging the fields of product design and physical simulation. It is applied for designing a modeled object representing a mechanical part formed in a material, subject in use to loads and having one or more constrained boundaries. This technique focuses on automatically generating optimized generative designs based on modifying their physical properties and behavior typically simulated through Finite Element Analysis (FEA). More specifically, topology optimization works by providing a Finite Element Mesh (FEM) for example by discretizing a design space in small elements, and data associated to the mesh. The technique then finds the optimized distribution and layout of material in the given discrete space by iteratively finding the most efficient elements with respect to a given objective function (e.g. related to the stiffness of the design) and a set of constraints (e.g. related to the total amount of allowable material).

Figure 9:
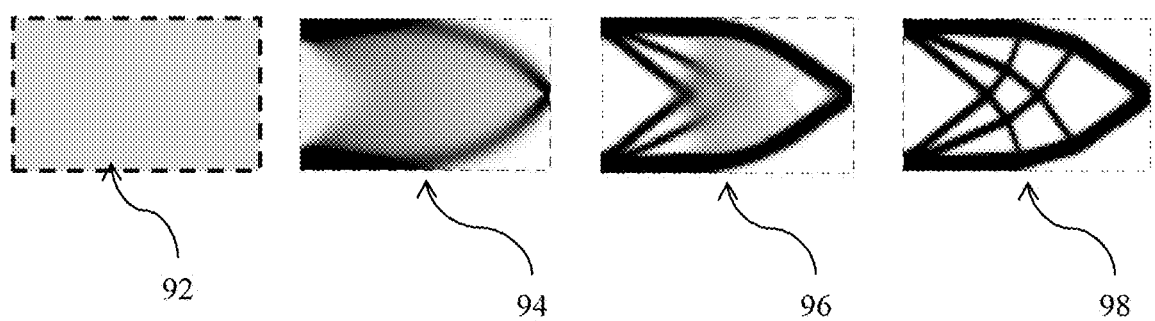

FIG. 9 illustrate topology optimization. FIG. 9 shows a design being optimized during an iterative topology optimization process, illustrating design evolution during the optimization process. FIG. 3 shows the initial design 92, the design after five optimization iterations 94, the design after ten optimization iterations 96, and the final converged design after twenty-five optimization iterations 98.

In the currently-discussed examples, the provided initial geometry resulting from the topology optimization thus has its distribution of material optimized with respect to an objective function and constraints. Specifically, referring back to FIG. 6, at step 3, the relative density value of each element results from the topology optimization, which has computed all the relative densities of material on all the finite elements such that these densities form an density field representing the optimized distribution and layout of material respect to the given objective function and the set of constraints.

In the currently-discussed examples, the relative densities/the distribution of material are not free variables of the objective function optimized by the orientation optimization. Only the orientations form the free variables of this function. This means that at step 4, the optimization workflow solves the nodal displacement of the orientation equilibrium, but not of density equilibrium. Furthermore the given objective function which pertains to the topology optimization may or may not be the same as the objective function which pertains to the orientation optimization. For example, the topology optimization may optimize stiffness, while the orientation optimization optimizes an objective function which may be different (e.g. relative to heat conduction) or which may as well be stiffness. Also, at step 7, the mathematical programming modifies the relative orientation on each element, but not the relative density.

In the currently-discussed examples, the result of the method is thus a 3D modeled object which:
has been topologically optimized, which means that the distribution of the material for the object is optimized (i.e. which tends to ensure optimized stiffness with respect to the forces exerted on the mechanical part), and
has its orientation field optimized, which means that the field of orientations of the physical property for the material tends to be continuous and compliant with the plurality of forces, as previously discussed.

In other examples, the method performs both the orientation optimization which has previously been discussed and a topology optimization. The optimization is nevertheless still referred to as "the orientation optimization" for conciseness, although it could be referred to as the "orientation and topology optimization", as in such examples the method designs a 3D modeled object via orientation optimization and topology optimization. In these examples, the physical property is the mechanical stiffness (also simply referred to as stiffness) and the constitutive law is the compliance matrix. These examples are now discussed.

The method thus still comprises the providing of the inputs to the orientation optimization as previously discussed. The providing and the inputs thereof are identical as previously discussed, save for a few variations.

For example, the material parameters may include parameters representing mechanical characteristics of the mechanical part. The material parameters may for example include the Young modulus of the material and/or the Poisson ratio of the material. Additional parameters may be included, such as an outer shell that must be kept, mechanical constitutive properties of the material, a target mass and/or a maximum allowed deformation.

The method integrates topology optimization and orientation optimization together. The objective function may thus represent any mechanical characteristic of the function. The optimization may in particular maximize stiffness. The objective function may for that be the compliance function. The compliance is for a structure the inverse of the stiffness of the structure. The compliance thus encapsulates the amount of deformation of the structure considered specified load cases and fixed boundary conditions. Therefore, when the optimization process minimizes the compliance, this corresponds to maximize the stiffness of the design for a given mass. In the currently discussed examples, the free variables of the objective function may thus include, besides the orientation, the distribution (i.e. layout) of quantity (e.g. volume fraction) of material over the 3D FEM. The optimization may thus vary the material quantity (e.g. volume fraction) in each finite element of the mesh to optimize the objective function. The objective function may depend on the material parameters (i.e. fixed variables of the objective function may involve the material parameters) and the optimization may be performed under constraint, including the global quantity constraint. In case the material quantity is a volume fraction of the material, the optimization process yields, besides the optimized orientations, a distribution of finite-element-wise volume fractions. In such a case, the optimization or the method may further comprise a further step of material filtering (e.g. automatically), that is, determining for each finite element whether it is (fully) filled with material or not, based on such volume fraction. For example, this may be based on a comparison with a (e.g. predetermined) threshold (e.g. higher than 0.1 or 0.2 and/or lower than 0.9 or 0.8, e.g. of the order of 0.5), a finite element being considered fully filled with material (resp. totally empty) if the volume fraction resulting from the optimization is higher (resp. lower) than the threshold.

In the currently-discussed examples, the result/output of general optimization workflow or of the method is thus a design/3D modeled object which:

has been topologically optimized, which means that the distribution of the material for the object is optimized (i.e. which tends to ensure optimized stiffness with respect to the plurality of forces), and has its orientation field optimized, which means that the field of orientations of the stiffness for the material tends to be continuous and compliant with the plurality of forces, as previously discussed.

The method still may integrate steps of the general optimization workflow, as discussed with reference to FIG. 6, e.g. according to any one of the examples thereof which have been previously discussed.

In the currently-discussed examples, at step 3, since the interpretation of elements with intermediate densities can be ambiguous, the general topology optimization workflow may introduce the penalization approach which forces intermediate elemental densities to be globally less efficient for the structural behavior than elements with the lower and upper bound of 0 or 1, respectively. This has the effect of driving the optimizer to product final designs with few intermediate densities, while still maintaining the continuous formulation, as shown in FIG. 9.

Still referring to FIG. 6, at step 4, in the currently discussed examples, the previously discussed global physical property matrix may be the stiffness matrix, in which case the orientation optimization assembles the global stiffness matrix, for example according to formulae (2) to (4). The orientation optimization may then solve for the nodal displacement of both the orientation and the density equilibrium, for example by solving the optimization problem (5). In other words, the general orientation optimization workflow may compute the orientation field and the deformation of the structure in its current state for the applied forces and boundary conditions.

Still referring to FIG. 6, at step 5, in the currently-discussed examples, the objective function may be the compliance of the structure. It is the inverse of the stiffness and thus encapsulates the amount of deformation of the structure considering the load cases and boundary conditions. Therefore, when the optimization process minimizes the compliance, this amounts to maximize the stiffness of the design for a given mass. The derivatives of the objective function with respect to the design variables may thus include, besides the derivatives of the objective function with respect to the orientation, the derivatives of the objective function with respect to the density of material. The orientation workflow may thus compute how both the relative orientation and density of each element should be changed to improve the compliance and fulfilling the constraints. This may be still performed using the well-known and classic "Adjoint Sensitivity Analysis", as previously discussed.

Still referring to FIG. 6, at step 7, in the currently-discussed examples, the optimization workflow may solve the optimization problem (5), as previously discussed, where K is the global stiffness matrix, $K_e^0$ the local stiffness matrix and B the strain-displacement matrix, C being the compliance matrix. At step 8, the method according to the currently-discussed examples may still perform the filtering of the orientations which as been previously discussed, for example according to formulae (6) and (7).

Examples of these currently-discussed examples are now discussed. In these examples, the method assembles the global stiffness matrix according to formulae (1) to (4), solves the optimization problem (5), and performs the orientation filtering according to formulae (6) and (7).

Figure 10:
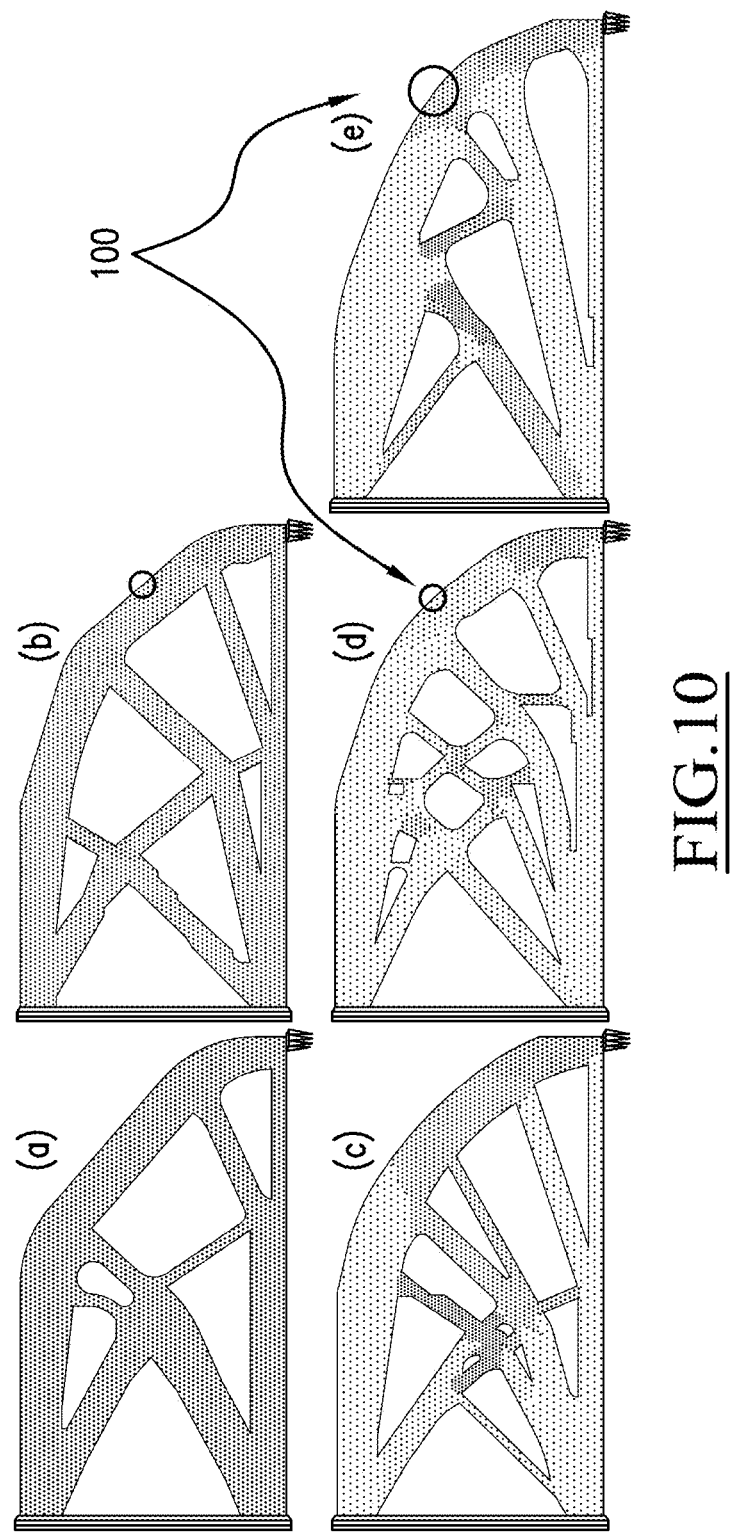

FIG. 10 illustrates a first one of these examples. Specifically, FIG. 10 illustrates the difference between optimization of the density field only (a), sequential optimization of the density field then the orientation field (b), and simultaneously optimization of both density and orientation fields (c), (d) (e). Moreover, FIG. 10 also highlights the effect of orientation filtering to ensure manufacturability of the design by comparing the results obtained without (c) and with (d and e) filter regularization. In (c), no orientation filtering is performed. In (d), the orientation filtering is performed with a radius equal to 1.5 elements. In (e), the orientation filtering is performed with a radius equal to 3 element. The radius is shown with a circle 100. This illustrates the ability of this approach to enforce length scale control on the design for both the density design variables and orientation design variables.

Figure 11:
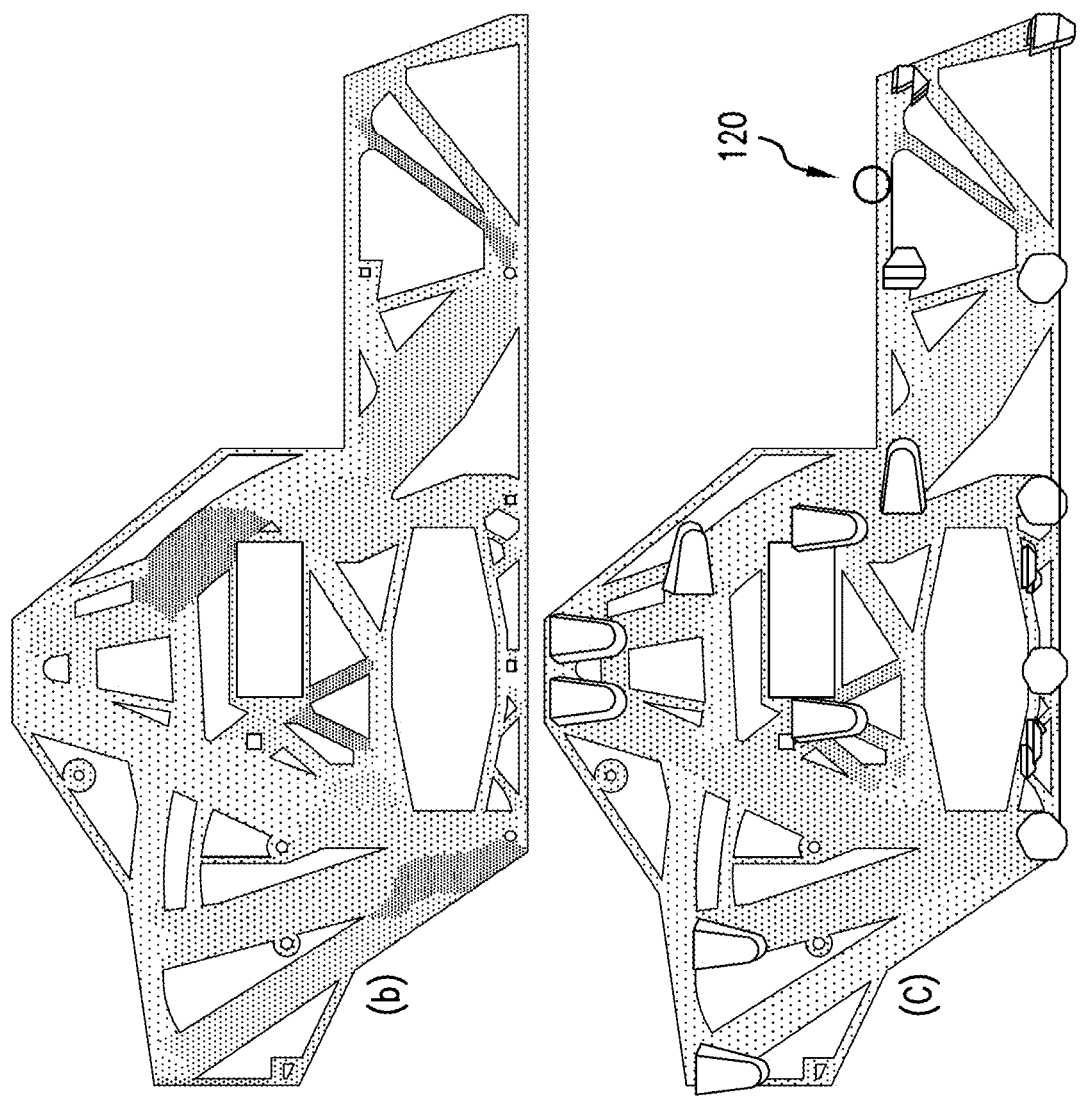
Figure 11:
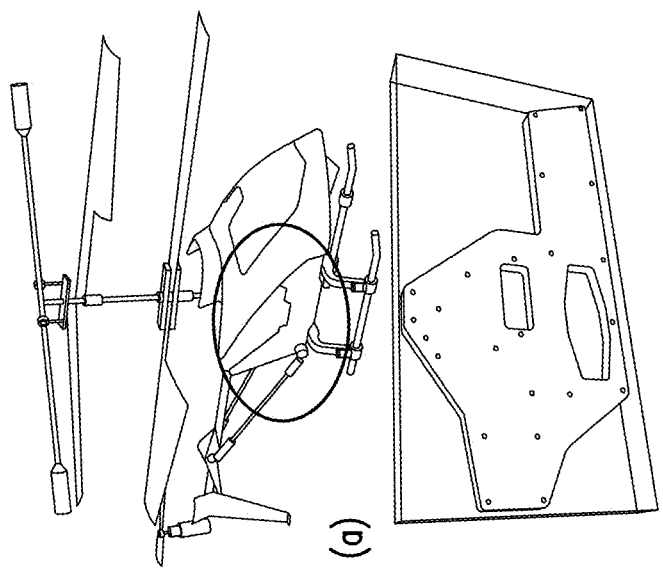

FIG. 11 illustrate a second one of these examples, where the method is used to optimize the structure of a helicopter frame in an industrial optimization setup (a) having multiple load cases. The use of regularizing through filters improves the homogeneity of the angle fiber orientations, preventing numerical local minima and ensuring manufacturability. FIG. 11 shows a comparison between simultaneous optimization of topological density design variables and fiber angle orientation variables using no fiber orientation filtering (b) and the same optimization using a fiber orientation filtering with a radius equal to 1.5 elements (c). The radius is shown with a circle 110.

Figure 12:
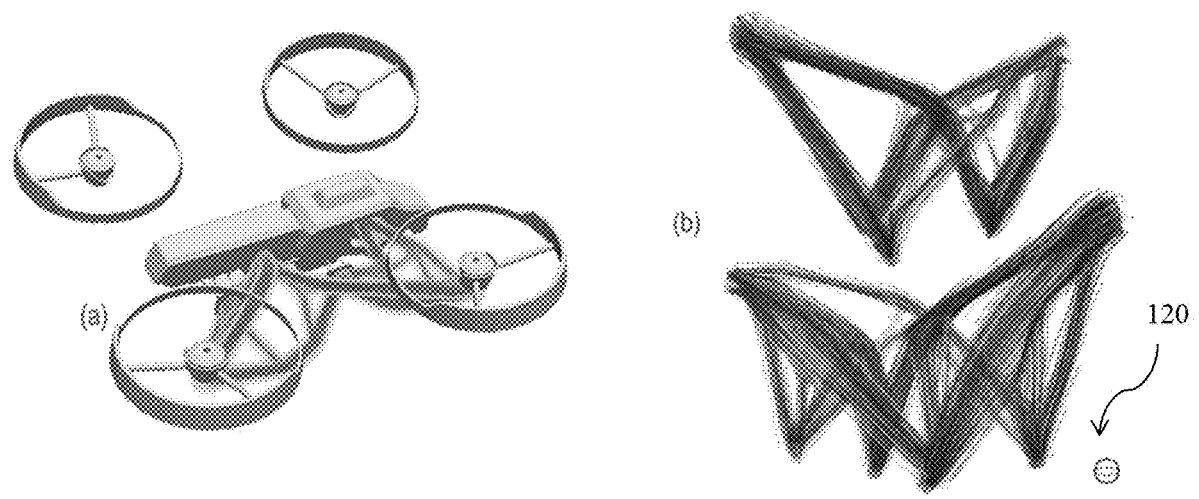

FIG. 12 demonstrates the capability of the method to be applied in 3D optimization problems. The given optimization setup (a) is for a quadcopter drone frame to be optimized with continuous fibers shown as streamlines (b) for the defined design space. Here a filtering with a radius (displayed here as a sphere 120 next to the design) equal to 1.5 elements is shown.

Figure 13:
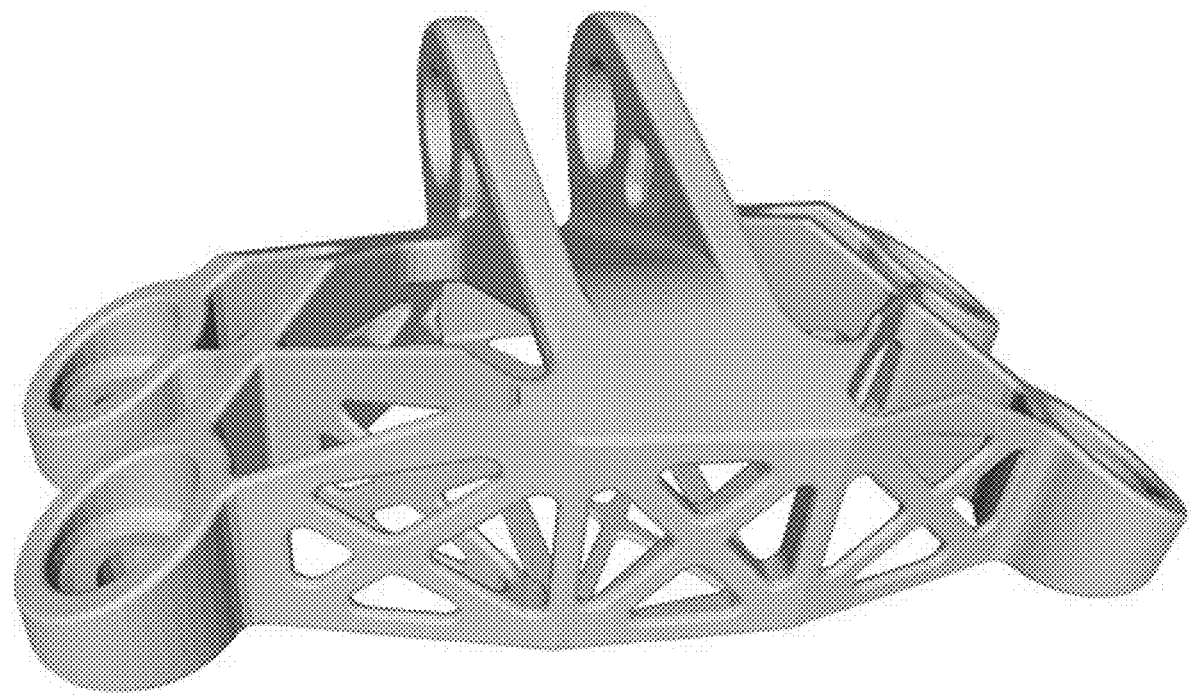
Figure 14:
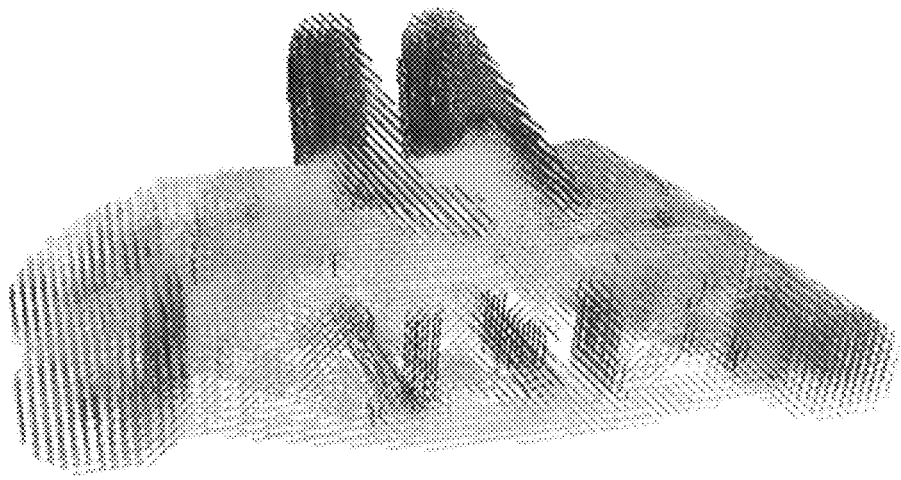
Figure 15:
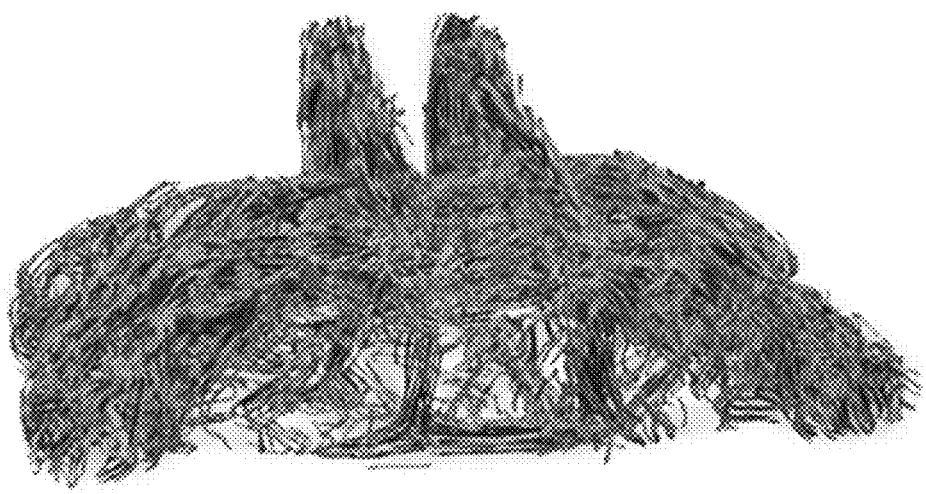

As in the examples shown in FIG. 12, the method may comprise, e.g. after the optimizing, displaying the 3D modeled object as streamlines. This streamline display allows to verify whether the optimized orientation field is indeed continuous or to the contrary irregular, which would not be possible for other display. This is illustrated in FIGS. 13 to 15. FIG. 13 shows a GE jet bracket designed by the method. FIG. 14 shows a display of the orientation field for the GE jet bracket, the display tending to show that the orientation field is regular enough. FIG. 15 shows the streamline display of the same orientation field, the display showing there that the orientation field features local areas with strong irregularities.

The invention claimed is:

1. A computer-implemented method for designing a 3D modeled object representing a mechanical part formed in a material having an anisotropic behavior with respect to a physical property, the mechanical part being a continuous fiber manufactured part to be manufactured further to its design according to the method, the method comprising:
   obtaining:
      a 3D finite element mesh, and
      data associated to the 3D finite element mesh and including:
         a plurality of forces forming multiple load cases, each load case being a set of one or more forces exerted at a same time on the mechanical part, the plurality of forces forming multiple load cases in that there exist two or more sets, each of one or more of the forces, which are not applied at the same time on the mechanical part, and which cannot accumulate and/or compensate each other, the multiple load cases yielding multiple different direction of forces, and
         boundary conditions; and
   optimizing an orientation field of the physical property for the material, the orientation field being distributed on the 3D finite element mesh in that each respective finite element of the 3D finite element mesh comprises a respective orientation and the respective orientations of the respective finite elements altogether form the orientation field, the optimization being by optimizing a value of an objective function having the orientation field as a free variable, the objective function rewarding orientation continuity with respect to the physical property in that an optimal value of the objective function corresponds to a continuity of the orientation field, the optimizing being based on the 3D finite element mesh and on the data associated to the 3D finite element mesh, the objective function depending on, for each respective finite element of the 3D finite element mesh, angle variables defined on the 3D finite element mesh and being a set of angles describing the respective orientations of the respective finite element, the optimization having as free variables the angle variables of all the respective finite elements and varying these free variables to align the respective orientations with the dominant directions of the forces, wherein the objective function is a non-convex function, and the optimizing comprises applying a non-convex sensitivity based optimization method and, at each iteration of the non-convex sensitivity based optimization method, filtering the orientation field, wherein the filtering of the orientation field comprises, for each element of the 3D finite element mesh, filtering the angle variables describing an orientation on the element by:

mapping the angle variables onto a 3D orientation vector expressed in Cartesian coordinates;

filtering the 3D orientation vector; and mapping the filtered 3D orientation vector back onto angle variables, wherein for each element i of the 3D finite element mesh, $$v_i = \begin{pmatrix} x_i \\ y_i \\ z_i \end{pmatrix}$$

being the 3D orientation vector expressed in Cartesian coordinates and resulting from the mapping of the angle variables of element i onto, $v_i$, the filtering of $v_i$ comprises computing the filtered 3D orientation vector $v_{filtered,i}$ as $$v_{filtered,i} = \sum_{j=1}^{N} \omega_{i,j} v_j$$

where N is a number of finite elements in the 3D finite element mesh, where the $v_j$ are other 3D orientation vectors and include $v_i$, and where for all j $\omega_{i,j}$ is a contribution of $v_j$ in a linear combination, $\omega_{i,j}$ being expressed by the following formula $$\omega_{i,j} = \frac{R - d(i,j)}{\sum_{k \in N_i}(R - d(i,k))}$$

where R is a predefined radius, where $d(i,j)$ is a Euclidean distance between an $i^{th}$ element and a $j^{th}$ element of the 3D finite element mesh, and where $N_i$ is the set of finite elements of the 3D finite element mesh of which Euclidean distance is strictly smaller than R, and wherein the designed continuous fiber manufactured part is thereby adapted for continuous fiber manufacturing with alignment of the fibers with the dominant directions of the forces.

2. The method of claim 1, wherein the non-convex sensitivity based optimization has an angular iteration, the angular iteration being initialized at a value larger than 30° and lower than 90°.

3. The method of claim 2, wherein the angular iteration decreases at each iteration of the non-convex sensitivity based optimization.

4. The method of claim 1, wherein the elements of the finite element mesh have all a same size, and the predefined radius is larger than 1.5 times the size, larger than two times the size or larger than three times the size.

5. The method of claim 1, wherein the anisotropic behavior is an orthotropic behavior.

6. The method of claim 1, further comprising generating the 3D modeled object representing the mechanical part based on the optimized orientation field of the physical property for the material, the mechanical part being manufactured according to the 3D modeled object.

7. A non-transitory computer readable storage medium having recorded thereon a computer program comprising instructions for performing a method for designing a 3D modeled object representing a mechanical part formed in a material having an anisotropic behavior with respect to a physical property, the mechanical part being a continuous fiber manufactured part to be manufactured further to its design according to the method, the method comprising:
   obtaining:
      a 3D finite element mesh, and
      data associated to the 3D finite element mesh and including:
         a plurality of forces forming multiple load cases, each load case being a set of one or more forces exerted at a same time on the mechanical part, the plurality of forces forming multiple load cases in that there exist two or more sets, each of one or more of the forces, which are not applied at a same time on the mechanical part, and which cannot accumulate and/or compensate each other, the multiple load cases yielding multiple different direction of forces, and
      boundary conditions; and
   optimizing an orientation field of the physical property for the material, the orientation field being distributed on the 3D finite element mesh in that each respective finite element of the 3D finite element mesh comprises a respective orientation and the respective orientations of the respective finite elements altogether form the orientation field, the optimization being by optimizing a value of an objective function having the orientation field as a free variable, the objective function rewarding orientation continuity with respect to the physical property in that an optimal value of the objective function corresponds to a continuity of the orientation field, the optimizing being based on the 3D finite element mesh and on the data associated to the 3D finite element mesh, the objective function depending on, for each respective finite element of the 3D finite element mesh, angle variables defined on the 3D finite element mesh and being a set of angles describing the respective orientations of the respective finite element, the optimization having as free variables the angle variables of all the respective finite elements and varying these free variables to align the respective orientations with the dominant directions of the forces,
   wherein the objective function is a non-convex function, and the optimizing comprises applying a non-convex sensitivity based optimization method and, at each iteration of the non-convex sensitivity based optimization method, filtering the orientation field,
   wherein the filtering of the orientation field comprises, for each element of the 3D finite element mesh, filtering the angle variables describing an orientation on the element by:
      mapping the angle variables onto a 3D orientation vector expressed in Cartesian coordinates;
      filtering the 3D orientation vector; and
      mapping the filtered 3D orientation vector back onto angle variables,
   wherein for each element i of the 3D finite element mesh, $$v_i = \begin{pmatrix} x_i \\ y_i \\ z_i \end{pmatrix}$$

being the 3D orientation vector expressed in Cartesian coordinates and resulting from the mapping of the angle variables of element i onto, $v_i$, the filtering of $v_i$ comprises computing the filtered 3D orientation vector $v_{filtered,i}$ as $$v_{filtered,i} = \sum_{j=1}^{N} \omega_{i,j} v_j$$

where N is a number of finite elements in the 3D finite element mesh, where the $v_j$ are other 3D orientation vectors and include $v_i$, and where for all j $\omega_{i,j}$ is a contribution of $v_j$ in a linear combination, $\omega_{i,j}$ being expressed by the following formula $$\omega_{i,j} = \frac{R - d(i, j)}{\sum_{k \in N_i} (R - d(i, k))}$$

where R is a predefined radius, where d(i,j) is a Euclidean distance between an $i^{th}$ element and a $j^{th}$ element of the 3D finite element mesh, and where $N_i$ is the set of finite elements of the 3D finite element mesh of which Euclidean distance is strictly smaller than R, and
   wherein the designed continuous fiber manufactured part is thereby adapted for continuous fiber manufacturing with alignment of the fibers with the dominant directions of the forces.

8. The non-transitory computer readable storage medium of claim 7, wherein the objective function is a non-convex function and the optimizing further includes applying a non-convex sensitivity based optimization.

9. The non-transitory computer readable storage medium of claim 8, wherein the non-convex sensitivity based optimization has an angular iteration, the angular iteration being initialized at a value larger than 30° and lower than 90°.

10. A computer comprising:
   a processor coupled to a memory and a graphical user interface,
   wherein the memory has recorded thereon a computer program including instructions for designing a 3D modeled object representing a mechanical part formed in a material having an anisotropic behavior with respect to a physical property, the mechanical part being a continuous fiber manufactured part to be manufactured further to its design, that when executed by the processor causes the processor to be configured to:
obtain:
  a 3D finite element mesh, and
  data associated to the 3D finite element mesh and including:
    a plurality of forces forming multiple load cases, each load case being a set of one or more forces exerted at a same time on the mechanical part, the plurality of forces forming multiple load cases in that there exist two or more sets, each of one or more of the forces, which are not applied at a same time on the mechanical part, and which cannot accumulate and/or compensate each other, the multiple load cases yielding multiple different direction of forces, and
    boundary conditions, and
optimize an orientation field of the physical property for the material, the orientation field being distributed on the 3D finite element mesh in that each respective finite element of the 3D finite element mesh comprises a respective orientation and the respective orientations of the respective finite elements altogether form the orientation field, the optimization being by optimizing a value of an objective function having the orientation field as a free variable, the objective function rewarding orientation continuity with respect to the physical property in that an optimal value of the objective function corresponds to a continuity of the orientation field, the optimizing being based on the 3D finite element mesh and on the data associated to the 3D finite element mesh, the objective function depending on, for each respective finite element of the 3D finite element mesh, angle variables defined on the 3D finite element mesh and being a set of angles describing the respective orientations of the respective finite element, the optimization having as free variables the angle variables of all the respective finite elements and varying these free variables to align the respective orientations with the dominant directions of the forces,
wherein the objective function is a non-convex function, and the optimizing comprises applying a non-convex sensitivity based optimization method and, at each iteration of the non-convex sensitivity based optimization method, filtering the orientation field,
wherein the filtering of the orientation field comprises, for each element of the 3D finite element mesh, filtering the angle variables describing an orientation on the element by:
  mapping the angle variables onto a 3D orientation vector expressed in Cartesian coordinates;
  filtering the 3D orientation vector; and
  mapping the filtered 3D orientation vector back onto angle variables,
wherein for each element i of the 3D finite element mesh, $$v_i = \begin{pmatrix} x_i \\ y_i \\ z_i \end{pmatrix}$$

being the 3D orientation vector expressed in Cartesian coordinates and resulting from the mapping of the angle variables of element i onto, $v_i$, the filtering of $v_i$ comprises computing the filtered 3D orientation vector $v_{filtered,i}$ as $$v_{filtered,i} = \sum_{j=1}^{N} \omega_{i,j} v_j$$

where N is a number of finite elements in the 3D finite element mesh, where the $v_j$ are other 3D orientation vectors and include $v_i$, and where for all j $\omega_{i,j}$ is a contribution of $v_j$ in a linear combination, $\omega_{i,j}$ being expressed by the following formula $$\omega_{i,j} = \frac{R - d(i,j)}{\sum_{k \in N_i} (R - d(i,k))}$$

where R is a predefined radius, where d(i,j) is a Euclidean distance between an $i^{th}$ element and a $j^{th}$ element of the 3D finite element mesh, and where $N_i$ is the set of finite elements of the 3D finite element mesh of which Euclidean distance is strictly smaller than R, and wherein the designed continuous fiber manufactured part is thereby adapted for continuous fiber manufacturing with alignment of the fibers with the dominant directions of the forces.

11. The computer of claim 10, wherein the objective function is a non-convex function and the processor is further configure to optimize the orientation field by being configured to apply a non-convex sensitivity based optimization.

12. The computer of claim 11, wherein the non-convex sensitivity based optimization has an angular iteration, the angular iteration being initialized at a value larger than 30° and lower than 90°.

* * * * *